United States Patent
Wong et al.

[11] Patent Number: 5,981,955
[45] Date of Patent: Nov. 9, 1999

[54] ISOTOPE SEPARATION USING A HIGH FIELD SOURCE AND IMPROVED COLLECTORS

[75] Inventors: Alfred Y. Wong; Glenn B. Rosenthal, both of Los Angeles, Calif.

[73] Assignee: The Regents of the University of California, Oakland, Calif.

[21] Appl. No.: 08/862,605

[22] Filed: May 23, 1997

Related U.S. Application Data

[63] Continuation-in-part of application No. 08/568,583, Dec. 7, 1995, abandoned.

[51] Int. Cl.⁶ ................................................. H01J 37/08
[52] U.S. Cl. ............................... 250/423 R; 250/423 P; 315/111.81
[58] Field of Search ........................... 250/281, 290, 250/291, 298, 423 P, 423 R; 315/111.81

[56] References Cited

U.S. PATENT DOCUMENTS

| | | | |
|---|---|---|---|
| 2,754,422 | 7/1956 | Lofgren et al. | 250/425 |
| 3,479,545 | 11/1969 | Wilson et al. | 250/423 R |
| 3,808,433 | 4/1974 | Fite et al. | 250/425 |
| 3,911,318 | 10/1975 | Spero et al. | 315/39 |
| 3,940,615 | 2/1976 | Kantrowitz | 250/284 |
| 3,973,121 | 8/1976 | Fite et al. | 250/425 |
| 4,081,677 | 3/1978 | Dawson | 250/290 |
| 4,178,507 | 12/1979 | Brunnee et al. | 250/423 R |
| 4,259,572 | 3/1981 | Brunnee et al. | 250/423 R |
| 4,298,798 | 11/1981 | Huffman | 250/423 R |
| 4,524,047 | 6/1985 | Patterson | 250/423 R |
| 4,757,203 | 7/1988 | Gil et al. | 250/291 |
| 4,925,542 | 5/1990 | Kidd | 204/192.31 |
| 5,115,135 | 5/1992 | Oomori et al. | 250/423 P |
| 5,370,765 | 12/1994 | Dandl | 156/643 |
| 5,389,154 | 2/1995 | Hiroshi et al. | 118/723 MR |
| 5,466,295 | 11/1995 | Getty | 315/111.81 |
| 5,506,475 | 4/1996 | Alton | 315/111.71 |
| 5,681,434 | 10/1997 | Eastlund | 250/298 |
| 5,707,452 | 1/1998 | Dandl | 118/723 W |

*Primary Examiner*—Bruce C. Anderson
*Attorney, Agent, or Firm*—Daniel L. Dawes

[57] ABSTRACT

A plasma chamber for use in isotope enrichment has a microwave feed to the ECRH microwave horns, which feed is led into the plasma chamber behind the sputter plate and perpendicular to the magnetic field for improved microwave waveguide routing and ease of microwave window handling and maintenance. Improved collector design includes a collector assembly placed behind the plasma source comprising a dump plate and flat and shield collector. A ring collector is provided outside the main plasma region in the case where two opposing magnetic mirrors are used and the resonant ions maintained between them. An improved collector assembly can also be provided by disposing the collector assembly in front of the plasma source region and having a double shield-and-slat collector for capturing high energy resonant ions or permitting passage of low energy ions therethrough. Sputter sources for nonconducting materials can be provided by using a thin surface coating applied to a metal backing. The surface coat has a thickness of approximately one ion implantation depth so that the backing plate bleeds the charge from the surface coat. The thin surface coat may continually be replenished within directed jet vapor from a plasma or a doped or filled conductive plasma sputter plate may be employed.

33 Claims, 14 Drawing Sheets

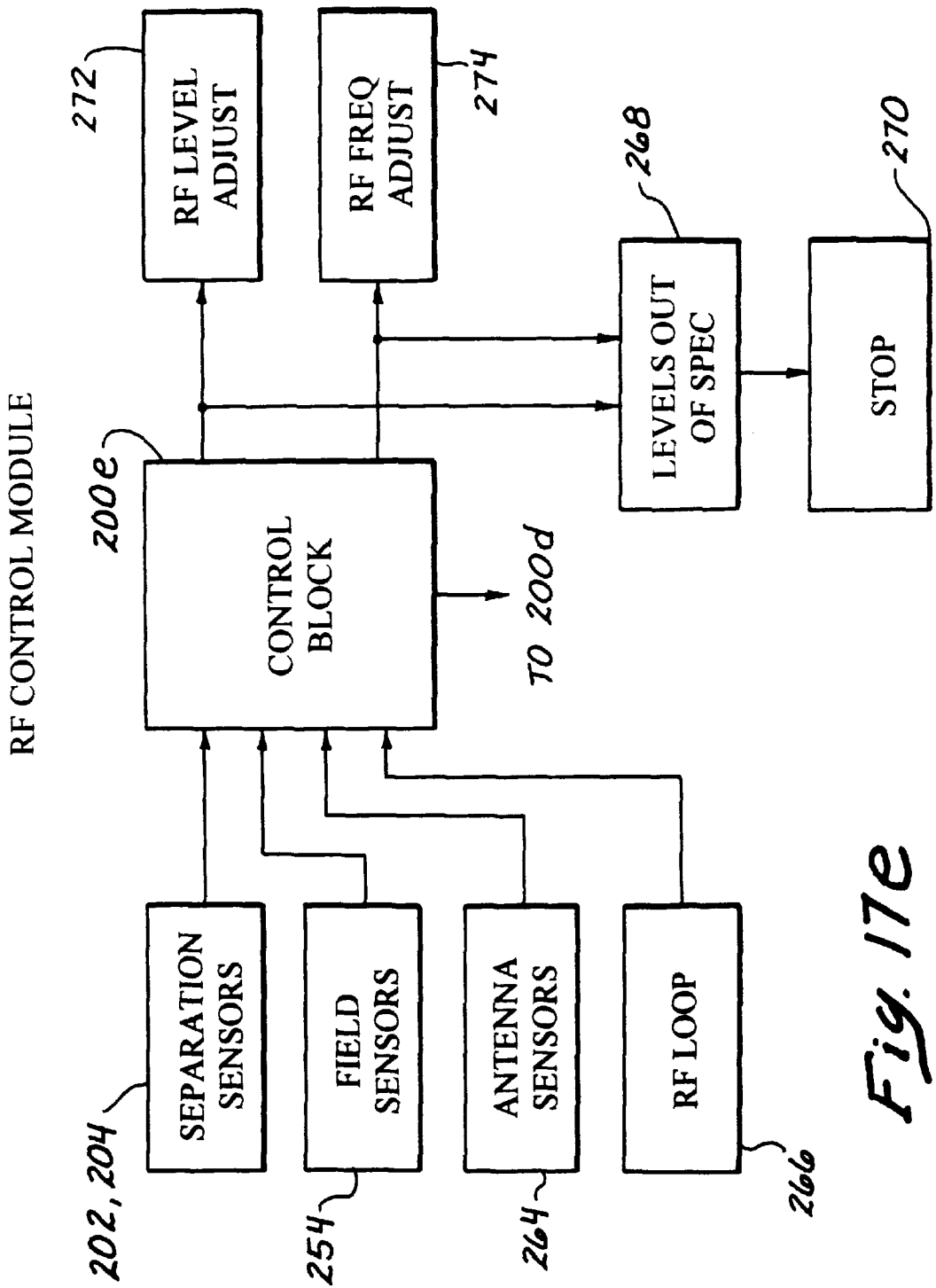

ISOTOPE SEPARATION USING A HIGH FIELD SOURCE AND IMPROVED COLLECTORS

The present application is a continuation-in-part application of application Ser. No. 08/568,583 filed Dec. 7, 1995, now abandoned which is incorporated herein by reference and attached as an Appendix.

BACKGROUND OF THE INVENTION

1. Field of the Invention

The invention relates to the field of plasma chambers and in particular to separation of isotopes by using magnetic mirrors in a plasma chamber in combination with improved collectors and plasma sources.

2. Description of the Prior Art

The prior art has devised extensive technologies relating to gaseous diffusion processes to separate isotopes. In addition the prior art has also devised a method for separating isotopes in a neutral dense plasma. In this prior art process, such as described by Dawson, "Isotope Separation by Magnetic Fields," U.S. Pat. No. 4,081,677 (1978), incorporated herein by reference, a neutral mixture of positive and negative ions of a desired product and electrons are injected into a partial vacuum to form a neutral dense plasma in a magnetic field where one of the isotopes of the product is given more energy than the others. The differential energy is imparted by selectively driving the desired isotope at its resonant frequency which is close to, but different from the cyclotron frequency of the other isotope(s). The cyclotron resonant frequency will generally depend upon the plasma density, the relative concentration of electrons if the plasma contains electrons, the strength of the magnetic field, the ratio of a charged mass of a particular isotopes and on various physical parameters of the plasma apparatus itself, such as the ratio of the plasma column length to its radius. The selected isotope is separated for others on the basis of the differential energy imparted to it. The separation is practiced by utilizing the differential diffusion of the ions across a magnetic field or magnetic mirrors may be utilized which confine the more energetic species. Dawson, however, failed to disclose and failed to find any operable mechanism for collecting the confined isotopic species.

Magnetic mirrors are shown in FIGS. 6 and 7 of Dawson in which a magnetic field in a downward direction is shown by arrow 71 and another magnetic field is provided going in an upward direction as shown by arrow 72. The two magnetic areas are separated by field free space 73. FIG. 7 illustrates the path of an ion 76 as it enters space 77. The particle collides at 78 with another particle and its path is changed to a downward spiral illustrated as 80. By subsequent collisions such as shown at 81, the particle moves eventually into the field free space 73 and then into the second magnetic field space 82 eventually to emerge at 83. The diffusion time of particle 76 depends on the Larmor radius, which is the radius of the spiral 80. Each collision of the particle transport the orbit of the ion by up to the diameter of the helix 80. As a result of the collision the particle has a roughly equal probability to move toward the left instead of toward the right. A second such particle is shown at 84. The more energetic species of ion will diffuse across magnetic spaces 77 and 82 more rapidly than the less energetic ions.

A pair of magnetic mirrors can also be used to confine a hotter species between the mirrors, while a cooler, less energetic species flows out of the mirror space as described in connection with FIG. 8 of Dawson. As an ion moves into a mirror region its transverse motion builds up at expense of its longitudinal motion. The effect is stronger the larger the initial transverse motion, i.e. motion perpendicular to the axis of the chamber and lines of the magnetic field. Hence, an ion, which has been heated in a transverse direction, upon reaching the right hand end of the chamber is returned toward the left as shown in 95, because it does not have enough longitudinal energy to pass through the mirror. The path of the less energetic ion is shown at 96. Conversely because this ion has less energy, it has less transverse motion and hence comparatively speaking a larger longitudinal motion. Due to its higher energy in the longitudinal direction, it can escape the magnetic mirror as shown at 97. As a result, the less energetic ions escape the mirror while the more energetic ions are confined between the two mirrors. However, the process of Dawson, called the Calutron process, realized only low isotope purities on the collected or plated product.

Therefore, what is needed are improvements to the Calutron process wherein isotope separation purities may be increased and product output increased.

BRIEF SUMMARY OF THE INVENTION

The invention is an improvement in a plasma chamber having a source region and an enrichment region contained within the plasma chamber. The source region is provided with a plasma source for producing a plasma. The improvement comprises a magnet assembly for generating a shaped magnetic field in the plasma chamber so that the shaped field provides a higher magnetic field intensity in the source region than in the enrichment region. As a result, as the plasma flows from the source region to the enrichment region, the plasma temperature in a direction perpendicular to the magnetic field decreases.

An electron cyclotron resonant heating (ECRH) zone is provided in the source region. The ECRH zone is in the higher magnetic field intensity provided in the source region so that as the plasma flows from the source region to the enrichment region, the plasma density decreases.

The ECRH region is energized by a source of microwave energy. The source of microwave energy includes a horn disposed in the plasma chamber and a waveguide coupling the horn to the source of microwave energy. The waveguide is routed into the plasma region in a direction generally perpendicular to the magnetic field in the source region.

The improvement further comprises an isotope collector. The isotope collector is disposed in the region of higher magnetic field strength, preferably but not necessarily in the source region.

The plasma chamber has two opposing ends and the collector is disposed within the plasma chamber at an end of the plasma chamber opposing the source region. The source region is disposed at one of the two ends. Each of the two ends of the plasma chamber is provided with a region of magnetic field strength higher than the enrichment region disposed between the two ends.

The plasma chamber is vertically oriented with respect to gravity so that the plasma source may include a liquid component having an exposed liquid surface within the plasma chamber.

In one embodiment the plasma source is an ECRH gas vapor source comprised of an oven for providing gas vapor to the ECRH zone. The ECRH zone is defined by providing a microwave field of exposure from the source of microwave energy in the source region and shaping the magnetic field in the source region so that the ECRH zone is in a region of a magnetic field gradient into which the gas vapor is directed from the oven. The ECRH zone has a thickness and the thickness of the ECRH zone is controlled by the steepness of the magnetic field gradient. The ECRH zone is narrower, the steeper the magnetic field gradient.

In a second embodiment the plasma source is an ECRH laser source comprising a laser and a target. The laser is focused on the target to provide an oblated vapor to the ECRH zone. The ECRH zone is redefined by positioning the source of microwave energy in the source region and shaping the magnetic field in the source region so that the ECRH zone is in a magnetic field gradient to which the oblated vapor is directed from the ECRH laser source.

In a third embodiment the plasma source is an ECRH gas jet source comprising a source of compressed gas coupled to a jet nozzle. The jet nozzle is disposed in the plasma chamber and oriented to direct a jet of the gas into the ECRH zone. The ECRH zone is defined by positioning the source of microwave energy in the source region and shaping the magnetic field in the source region so that the ECRH zone is in a magnetic field gradient to which the gas vapor is directed from the ECRH gas jet source. The gas jet directs the gas axially through the plasma chamber into the enrichment zone through the ECRH zone at a velocity sufficiently high to reduce Doppler shift with respect to ion cyclotron resonance heating (ICRH) in the enrichment zone.

The improvement further comprises a diverter to direct microwaves into the ECRH zone.

The waveguide includes a microwave window for providing a vacuum seal between the plasma chamber and the microwave source. while permitting transmission of microwaves therethrough. Routing of the waveguide permits the microwave window to be positioned exterior to the plasma chamber by orienting that portion of the waveguide in or proximate to the plasma chamber perpendicularly to the magnetic field within the chamber to avoid plasma breakdown within the waveguide.

The improvement comprises a magnetic mirror for discriminatory separation of isotopes of the plasma. In one embodiment, two opposing magnetic mirrors are provided at each of the two ends of the plasma chamber and a cylinder ring collector positioned outside the main plasma region collects the selected isotope.

The plasma chamber is provided with a product plate and a dump plate. The magnetic mirror is disposed within the plasma chamber on the end of the plasma chamber opposing the source region so that nonresonant ions are discriminatorily disposed on a dump plate disposed behind the magnetic mirror and resonant ions are reflected to the opposing end of the plasma chamber and deposited on a product plate. The improvement further comprises a plasma injector wherein the plasma is injected through the product plate. The enrichment region includes ICRH antennas for heating the plasma in the enrichment region and the injector injects the plasma at a high axial velocity into the plasma chamber to reduce back-scattered particles and improve coupling to the ICRH antennas.

The improvement is also a collector which is disposed behind the plasma source. The collector comprises a dump plate for back-scattered ions and a slat-and-shield assembly for collection of resonant ions.

In a second embodiment the collector is disposed in front of the plasma source region and is comprised of a double shielded slat-and-shield assembly to permit transmission of low energy ions from the plasma source therethrough and to permit collection therein of high energy resonant ions from the plasma enrichment region.

The improvement further comprises a plurality of ECRH microwave horns coupled to a corresponding plurality of microwave energy sources. Each of the ECRH horns establishes a separate ECRH zone in the source region adjacent to each other so that the ionization state of the plasma generated within the multiple ECRH zones is controllable. Each of the ECRH horns provide energy to the corresponding ECRH zones at different tuned frequencies at different locations within the plasma chamber as determined by the resonance condition with the magnetic field to create a broad ECRH zone with shaped energy distribution therein.

The improvement is a sputter source of nonconductive material comprising a thin coating of the nonconducting material disposed on and electrically coupled to a conductive backing plate. The thickness of the coating is comparable to the ion implantation depth for incoming ions to the coating. The improvement comprise a thermal oven for evaporating nonconductive material into a jet directed at the thin surface coating to refresh the surface coating as the coating is depleted by sputtering. The improvement further comprises a highly sputterable material disposed in the conductive backing plates. Any significant indication of the sputterable trace material in the plasma indicating thinning of the coating and a decrease in plasma density indicating an increase in thickness of the coating for feedback control of the oven.

In another embodiment the plasma source includes a sputter plate composed of a nonconductive material provided with imbedded conductive doping for transferring excess charge from the plate.

In yet another embodiment the plasma source includes a sputter plate which is comprised of a filled porous conductive plate filled with sputterable nonconductive material for transferring excess charge from the plate.

The plasma chamber includes a collection region and is combined with a plurality of subsystems for operating the source enrichment and collection regions to produce an isotope enriched product. The improvement further comprises a computer coupled to the subsystems for automated operation of the subsystems so that operator intervention is normally required only for source loading of the plasma source and product unloading from the collection region.

The invention includes each of these improvement separately from each other and in combination with each other, as well as methods for performing the operations of which each of these improvement are capable.

The invention may now be better visualized by turning to the following drawings wherein like elements are referenced by like numerals.

BRIEF DESCRIPTION OF THE DRAWINGS

FIG. 17e is a block diagram illustrating the computerized automation of the PEP system of FIG. 16 as implemented in the RF control module of the software.

Figure 1:
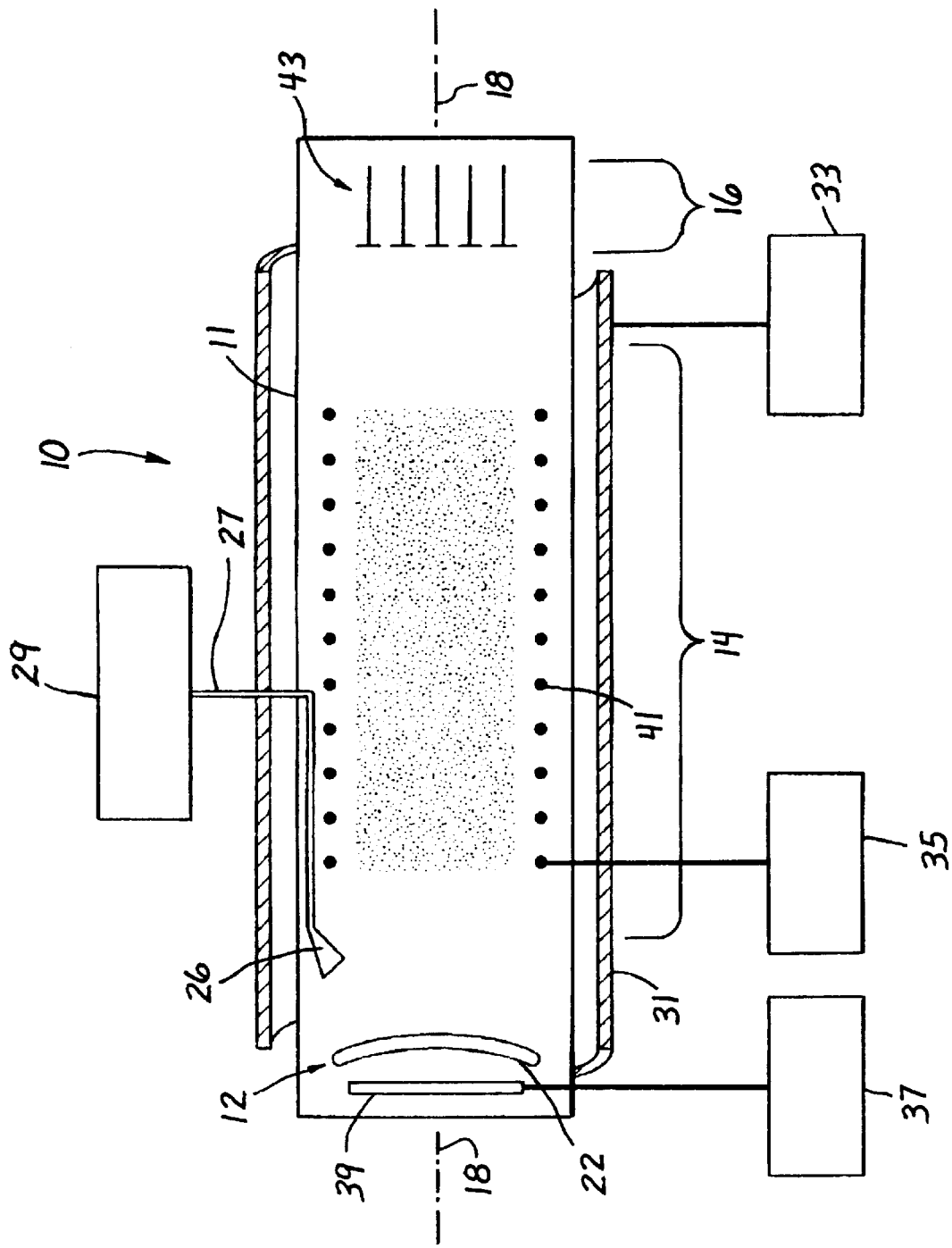
FIG. 1 is a schematic diagram of a prior art plasma chamber as used for plasma enrichment processes (PEP) characteristic of the prior art.

The illustrated embodiment of the invention can now be understood by turning to the following detailed description in light of the above drawings.

DETAILED DESCRIPTION OF THE PREFERRED EMBODIMENTS

Improvements to a plasma chamber for use in isotope enrichment and other plasma processes are realized by devising a magnetic field and microwave feed in a plasma chamber so that electron cyclotron resonance heating zones are established in high intensity magnetic field regions and the enrichment zone is at a lower intensity field to decrease plasma temperatures and increase plasma densities. Plasma sources are improved by providing a gas vapor ECRH plasma sources utilizing oven laser or gas jet created vapor plumes in the high field ECRH zone as described. Microwave feed to the ECRH microwave horns is led into the plasma chamber behind the sputter plate and perpendicular to the magnetic field for improved microwave waveguide routing and ease of microwave window handling and maintenance. Collection efficiency is improved by providing at least one magnetic mirror in the plasma chamber in combination with improved plasma source and collector design. Improved collector design includes a collector assembly placed behind the plasma source comprising a dump plate and flat and shield collector. A ring collector is provided outside the main plasma region in the case where two opposing magnetic mirrors are used and the resonant ions maintained between them. An improved collector assembly can also be provided by disposing the collector assembly in front of the plasma source region and having a double shield-and-slat collector for capturing high energy resonant ions or permitting passage of low energy ions therethrough. The ionization state of the plasma is further improved by providing the plurality of spaced ECRH zones with shaped energy distributions using a corresponding plurality of ECRH horns. Sputter sources for nonconducting materials can be provided by using a thin surface coating applied to a metal backing. The surface coat has a thickness of approximately one ion implantation depth so that the backing plate bleeds the charge from the surface coat. The thin surface coat may continually be replenished within directed jet vapor from a plasma or a doped or filled conductive plasma sputter plate may be employed. The plasma chamber is vertically oriented to permit liquid sputter plates retained within open vats or boats in the plasma chamber. The entire operation of the plasma chamber is computer automated with feedback controls so that tuning and adjustment of each of the control parameters of the plasma chamber are automatically monitored and corrected in all normal circumstances without operator intervention.

The invention thus is a number of improvements in a plasma chamber or system for isotope enrichment, and other plasma processes, plasma coatings and etchings. The invention is realized in a plasma apparatus, which has an elongated chamber for holding a main plasma. An axial magnetic field is generated in the plasma chamber, which is also provided with a plasma source. Ionized isotopes from the plasma source move along the elongated chamber driven or heated at a resonant frequency of a desired one of the isotopes. A collector separates the isotopes based on their differential energies.

Figure 8:
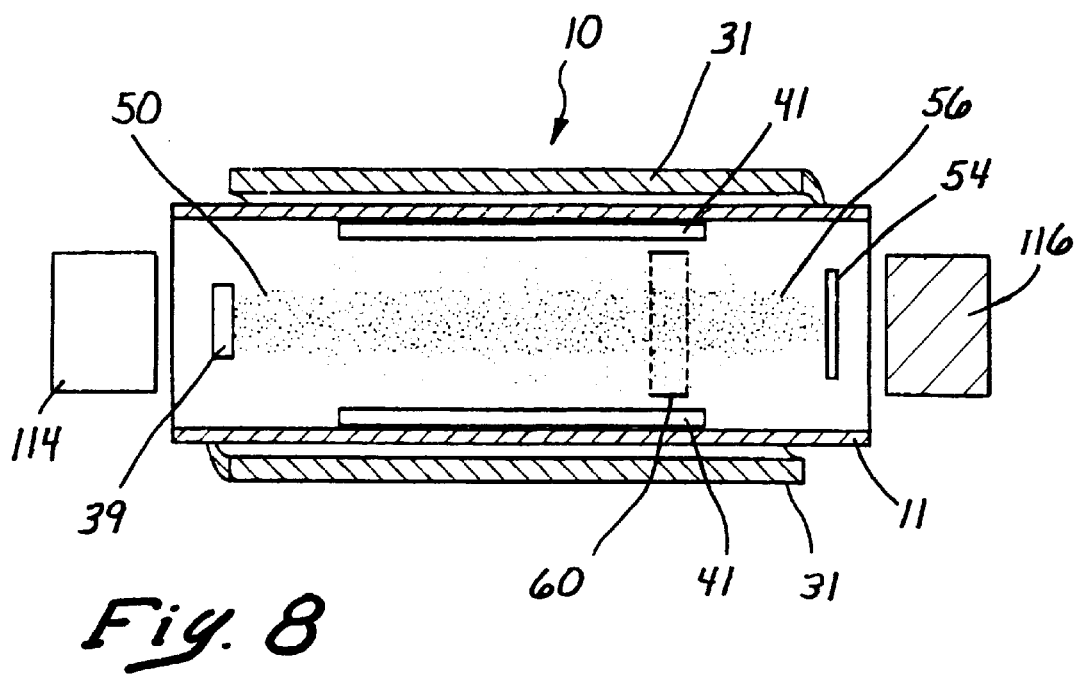
FIG. 8 is a simplified diagram illustrating a double mirror plasma chamber of the invention whereby higher collection efficiencies enrichment levels are achieved.
Figure 9:
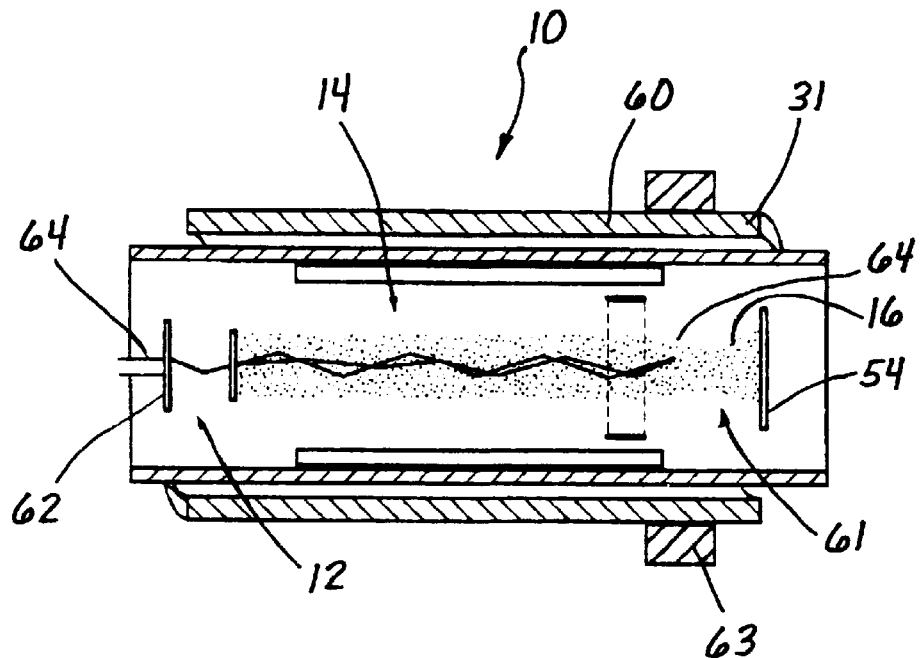
FIG. 9 is a simplified diagram illustrating a single mirror plasma chamber of the invention whereby higher collection efficiencies enrichment levels are achieved.
Figure 10:
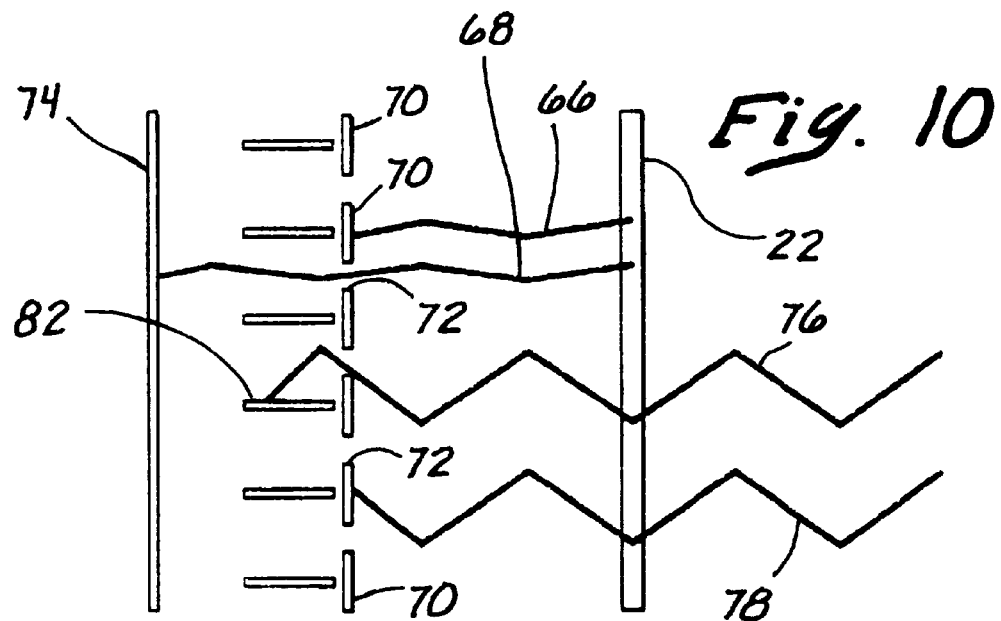
FIG. 10 is a schematic diagram illustrating a collector assembly for use behind the plasma source in the improved single mirror configuration of FIG. 9.
Figure 15:
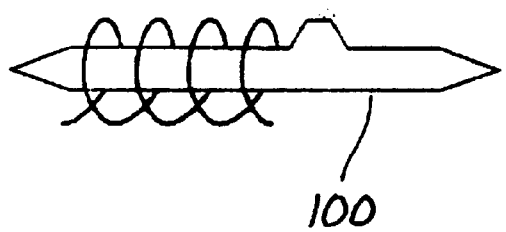
FIG. 15 is a cross-sectional diagram of a sputter plate for use with nonconducting plasma materials wherein the nonconducting material is incorporated as a doping or fill in a porous conductive substrate.
Figure 15:
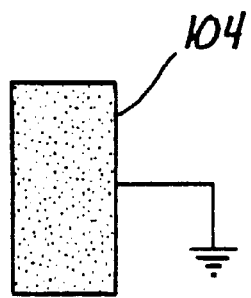

The improvement comprises high field plasma sources as shown and described in connection with FIG. 3; improved ECRH plasma sources as shown and described in connection with FIGS. 4–6; an improved microwave routing configuration for ECRH plasma sources as shown and described in connection with FIG. 7; and a plasma chamber system with one or more magnetic mirrors disposed at one or opposing ends of the elongated chamber so that resonant ions are reflected between the two mirrors or at least one opposing the plasma source as shown and described in connection with FIGS. 8 and 9. At least one of the magnetic mirrors in the case of a pair of mirrors is a higher field strength in the predetermined magnetic field in the chamber so that nonresonant ions pass through the magnetic mirror and resonant ions are reflected from it. The collector for capturing the resonant ions comprises a circular ring outside of the main plasma in the main chamber. Improved product collectors as shown and described in connection with FIGS. 10 and 11; an improved multiple ECRH ionizer zone as shown and described in connection with FIG. 12; improved sputter plates for nonconducting material as shown and described in connection with FIGS. 13 15; and an improved computer control for a PEP system as shown and described in connection with FIGS. 17a–e. Further, the plasma chamber vertically configured to allow the use of different types of vapor sources and a better use of the magnet systems as shown in FIGS. 8 and 9.

Before considering the improvements of the invention, a brief introduction to plasma enrichment processes help set the context of the illustrated embodiment. The plasma enrichment process (PEP) distinguishes between different particle masses or isotopes by their cyclotron frequency in a magnetic field. The particles are fully ionized in the near vacuum and placed in a uniform magnetic field where they orbit around the field lines at their cyclotron frequencies. Because of the mass dependence of cyclotron frequency, the particles with a specific mass will be selectively accelerated or become more energetic. This is the mechanism that allows discrimination or separation between isotopic masses based on the different energies of the isotopic species.

In general, a PEP system, generally denoted by reference numeral 10 in FIG. 1, is comprised of an evacuated plasma chamber 11 in which a generally axial magnetic field is provided by a toroidal, water-cooled, magnet assembly 31 powered by magnet power source 33. Plasma chamber 11 has three regions, a source region 12, an enrichment region 14 and a collection region 16. To a certain degree, each of these regions 12, 14 and 16 can be treated independently since each has their own special requirements. In PEP system 10, an ionized source region 12 is the situs for creation of a plasma that flows into enrichment region 14. Source region 12 is created in any one of a number of ways, some of which are described below, but normally includes some type of controller/power supply 37 in combination with a source of atoms for ionization, such as a source plate 39. As the plasma moves or drifts through enrichment region 14, the desired isotopic species is selectively heated in the direction perpendicular to the longitudinal axis 18 of plasma chamber 12. This heating is called ion cyclotron resonant heating (ICRH) and occurs as a result of energy coupled into the plasma by means of ICRH antenna 41 driven by oscillator/power supply 35. The kinetic energy coupled into the plasma, also characterized as its temperature, is directionally dependent, so that contrary to matter in the ordinary gas, liquid or solid states, matter in a plasma state can and usually does have dramatically different temperatures in different directions. The discriminatorily heated plasma ultimately arrives at collector region 16 where particles with high transverse energy perpendicular to axis 18, are collected, while particles with a lower perpendicular energy are rejected or collected in a particle dump plate comprising part of collector 43. Each of the elements described has one or more parameters of operation and control which can be monitored and adjustment for the specific application to which PEP system 10 is applied.

Consider now the source region. Source region 12 produces a plasma from a selected source material having two or more isotopic elements. This plasma ideally should be fully ionized and have sufficient density to meet the operational requirements for the specific design and parameters of PEP system 10 being used. Ideally the operation within plasma region 12 will not interfere with the separation process occurring in enrichment region 14. Assume for the sake of illustration that plasma source 12 includes an ECRH zone or an electron cyclotron resonant heating zone 22. An ECRH plasma source creates a localized zone 22 where the electrons are heated to several electron volts by absorption of microwave power at the electron cyclotron frequency. Any neutral particles passing through ECRH zone 22 are ionized and confined by the magnetic field in plasma chamber 11 to produce a plasma stream. Typically, ECRH zone 22 is therefore supplied a stream of neutral or ionized particles from which the plasma is formed. In general many types of neutral sources can be used including those utilizing a direct gas feed, ion sputtering, evaporation and the like.

To prevent the ECRH zone 22 from interfering from the enrichment process, source region 12 and enrichment region 14 must be separate, which is typically achieved from providing different magnetic fields in the two regions. The location of source region 12 and enrichment region 14 is determined by a resonance condition that depends on the magnetic field to allow the regions to be separated. In general, the magnetic field of the enrichment region is at least half the magnitude of the field at the source region in order to avoid multiple ECRH zones at harmonics of the resonant cyclotron frequency. The existence of multiple harmonic resonance regions may prevent propagation of the ECRH power to the actual ionization location, or require additional power in the enrichment region to overcome the additional thermal energy input into the plasma from the harmonic zones. Therefore, the harmonic ECRH zones are minimized as much as possible.

In any event, when a plasma is ionized with an ECRH zone, the location of the ionization zone will be at the location where the electron resonant condition, $\omega_{ecrh} = eB_s/mc$, is satisfied, where $B_s$ is magnetic field in source region 12, m the electron mass, c the speed of light, e the electron charge, and $\omega_{ecrh}$ the electron plasma frequency. Thus, wherever the magnetic field is provided that satisfies this condition, there also will be ECRH ionization zone 22. In applications where it is desirable to specifically locate the ionization zone, such as in plasma processing, isotope enrichment or plasma coating, ECRH resonant zone 22 is localized by shaping the magnetic field in plasma chamber 11. The thickness of ionization zone 22 is determined by the local field gradient at the site.

Figure 2:
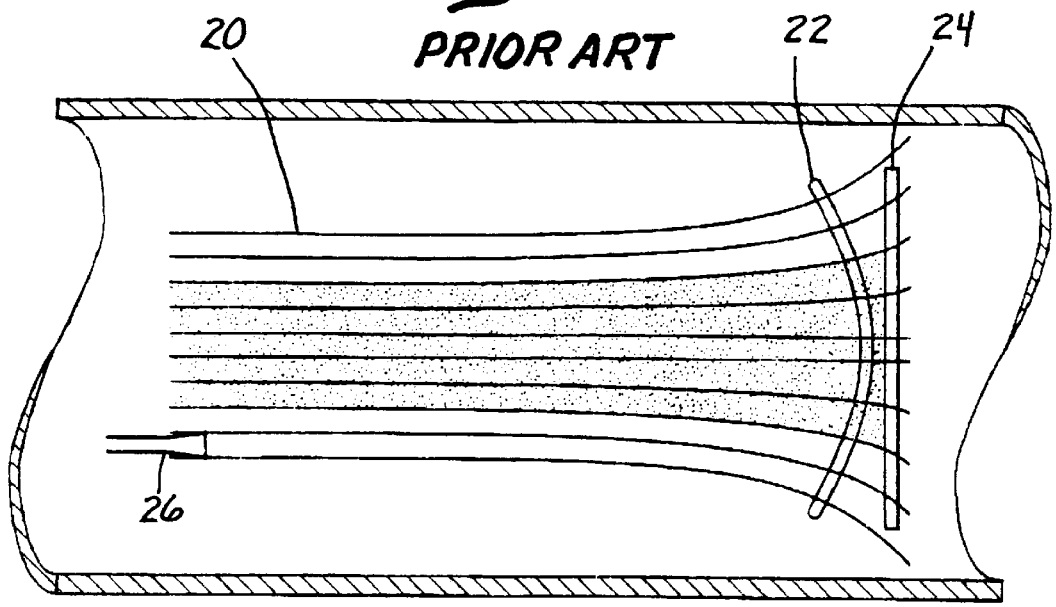
FIG. 2 is a schematic diagram of a prior art source plasma in a low field configuration characteristic of the prior art.

In the conventional art this has been achieved by placing the ECRH zone in a low magnetic field provided in source region 12 at one end of chamber 11 as shown in FIG. 2, i.e. in a portion of the magnetic field lower in magnitude than the adjacent locations to which the plasma will flow when formed. The magnetic field lines represented by lines 20 diverge or weaken in intensity in the area of ECRH resonance zone 22 just in front of the plasma sputter plate 24. The ECRH zone is generated in the low field region by means of microwave energy supplied through microwave horn 26.

Figure 3:
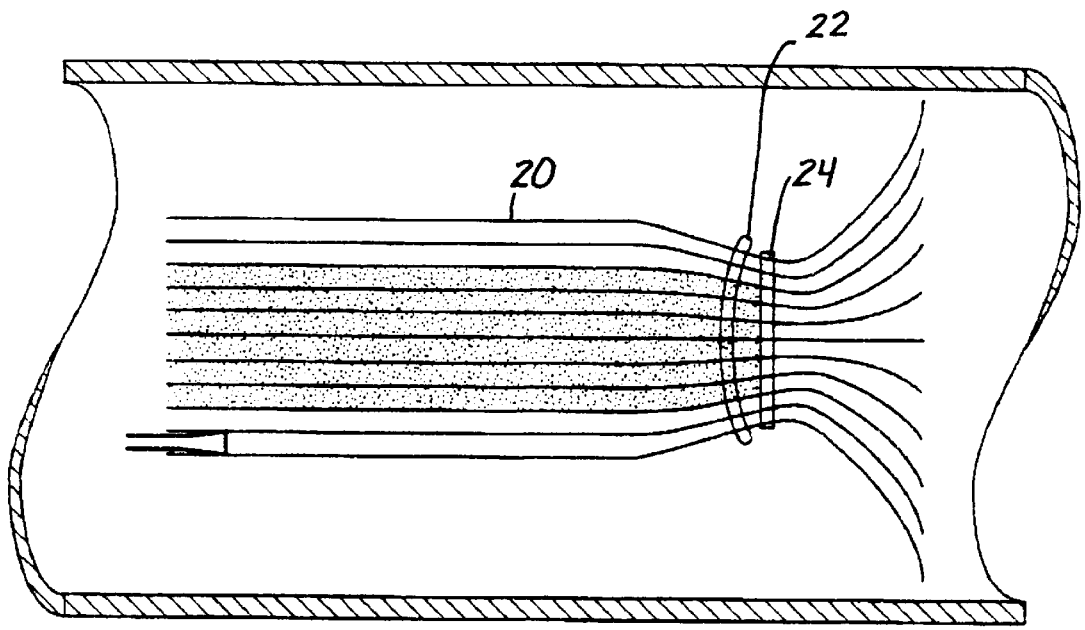
FIG. 3 is a schematic diagram of a high field plasma source configuration according to the invention.

FIG. 3 diagramatically depicts the opposite situation in which ECRH zone 22 is disposed in a high field strength region of plasma chamber 11 where magnetic lines symbolically are shown to constrict or increase in intensity, i.e. . where the magnetic field magnitude is greater than the magnitude of the magnetic field to which the plasma will flow once generated. The generation of the ECRH zone in the high field region as shown in FIG. 3 instead of the low field region as shown in FIG. 2 has several advantages for the generation of the plasma source. As the plasma flows from one region to another, the plasma temperature is changed as shown in equation (1).

$$T_{\perp W} = T_{\perp S}(B_W/B_S) \tag{1}$$

$$T_{\perp W} = T_{\parallel S} + T_{\perp S}(1 - B_W/B_S)$$

Where the W subscript indicates the working plasma or the plasma outside of source region 12, the S subscript indicates the source plasma, $T_\perp$ indicates the temperature in the direction perpendicular to longitudinal axis 18, $T_\parallel$ indicates the temperature in the direction of parallel to longitudinal axis 18, and B is a magnetic field. In the case where the source field, $B_S$, is higher than the working field, $B_W$, the plasma will cool in the perpendicular direction and heat in the parallel direction. This results in a cooler plasma than the reverse case.

The cooler plasma is of great advantage in many applications. For example, in the case of isotope enrichment, the lower plasma temperature corresponds to a lower noise level and either a higher degree of final enrichment and/or a higher plasma throughput for the same enrichment level. In the illustrated embodiment the ratio of $B_W/B_S$ is 0.5 or greater so that the temperature of the plasma is at least twice as cool as would otherwise be the case.

Additionally, the generation of the plasma in the high field region makes better use of the ECRH drive system which is comprised of microwave horn 26 and its power source 37. Generally, an ECRH generated plasma produces plasma until a cutoff frequency is reached, namely when the plasma frequency equals the electron cyclotron frequency. Generally, and specifically in the case of isotope enrichment, this density level is in excess of what can be used in the working plasma in enrichment region 14. When the plasma is allowed to expand into a lower field region, this results in not only a decrease in plasma temperature, but also a decrease in plasma density. This in turn allows the plasma source to be made smaller for the same size working plasma or field enrichment region 14. As a result, better use is made of the high energy efficiency of ECRH plasma sources.

Therefore, the PEP device 10 of FIG. 1 is configured according to the invention so that the magnetic field has a high field strength in source region 12. The highest plasma density and throughput are thus obtained when the source is placed at the highest or higher magnetic field in chamber 11.

Figure 4:
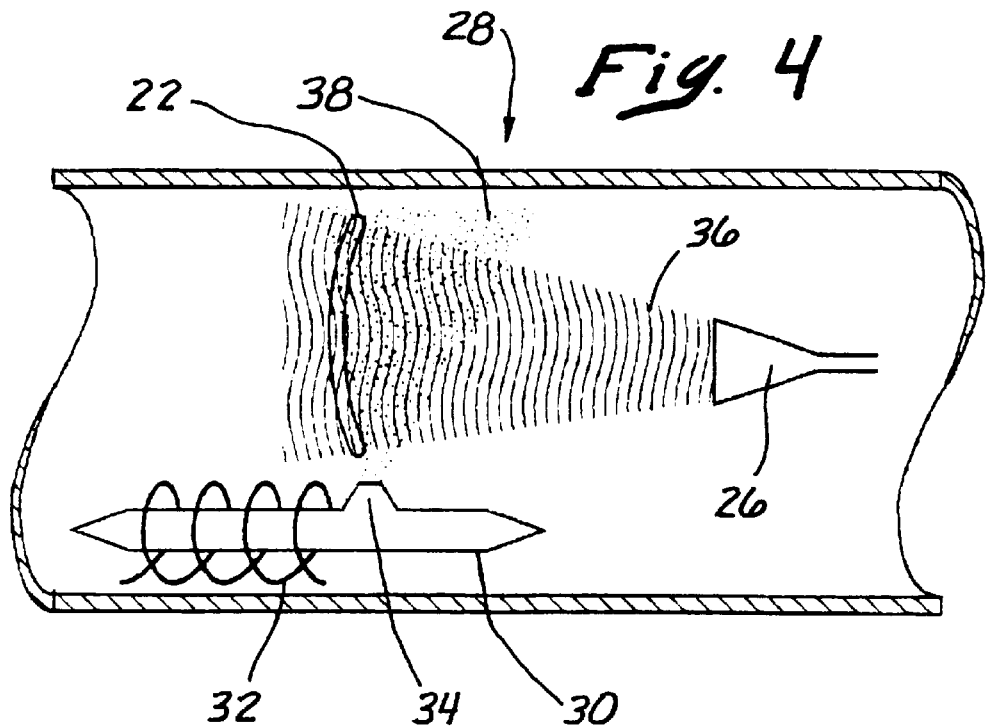
FIG. 4 is a schematic diagram illustrating an oven heated vapor source for the electron cyclotron resonant heating (ECRH) plasma source of the invention.
Figure 5:
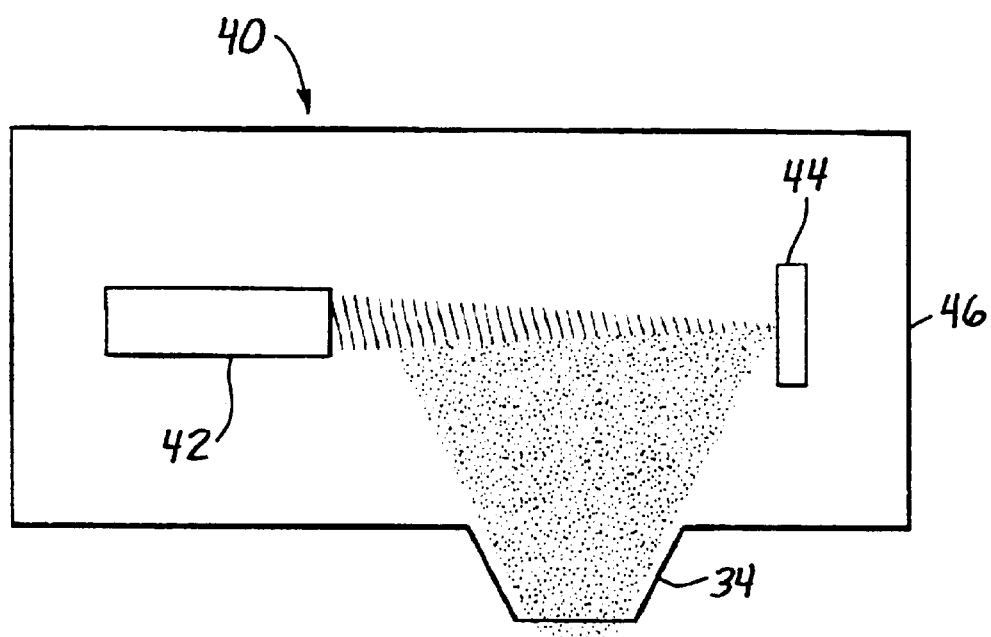
FIG. 5 is a schematic diagram illustrating a laser heated vapor source for an electron cyclotron resonant heating (ECRH) plasma source of the invention.

Another improvement of the invention is the use of an ECRH gas vapor source as diagramatically depicted in FIG. 4. The use of a gas vapor source allows the plasma to be generated out of materials that are not suitable or impossible to obtain from an ECRH sputter source using ion sputtering as is the conventional technique. Gas vapor sources of this type are particularly suitable for isotope enrichment, plasma processing, plasma coating and other processes. The gas vapor source, generally denoted in FIG. 4 by reference 28, is comprised of a thermal oven 30 that is used to direct a stream of gas vapor into ECRH ionizer zone 22 by means of a nozzle 34. Oven 30 is heated by a source of heat, such a electrical resistance heater 32, which vaporizes the source material which is then directed out of a nozzle or orifice 34 to create a region of vapor plume 38 in microwave heating field 36 from horn 26 in which ECRH zone 22 is localized. The position and hence effects of the ionizer are localized by setting ECRH zone 22 on a magnetic field gradient with the chamber. The steeper the magnetic field gradient, the narrower ECRH zone 22.

The exact type and configuration of oven 30 utilized in a vapor source as shown on FIG. 4 is important if not critical to the operation of ECRH gas vapor source 28. The proper oven characteristic must be maintained to obtain a uniform plasma density in temperature, which is important in many plasma applications. In one embodiment the vapor source evaporator used for the production of calcium vapor is comprised of a conventional directly heated oven 30, appropriately located near ECRH zone 22. The key features to the location of oven 22 are that the vapor should cover ECRH zone 22 without covering too much other volume, since this is simply wasted material. Oven 30 should not touch ECRH zone 22 since it will drain electrons from the zone.

FIG. 4a depicts a physical layout of oven 30 with dimensions, which are dependent on both magnetic field values and ECRH frequencies. The heater arrangements for oven 30 involve controlling the current through oven 30 to obtain the appropriate level of Ca vapor in ECRH zone 22. The appropriate level in turn depend on the magnetic field in ECRH zone 22 and the desired plasma density. As a general rule the Ca vapor density must be higher than the desired plasma density by about a factor of two in ECRH zone 22. This requires then active feedback monitoring either of the plasma density or the Ca vapor density and control of the oven temperature.

An alternative to a resistance heated oven source may comprise an ECRH laser source. Instead of the vapor oven as conceptually described in connection with FIG. 4, oven 30 is replaced by a laser oblation source 40 depicted in FIG. 5. Laser oblation source 40 in FIG. 5 is comprised of a laser 42 focused on a target surface 44. Source material is oblated or instantaneously vaporized from target 44 and directed from the oven containment 46 through an orifice or a nozzle 34 into ECRH zone 22 as described previously in connection with FIG. 4. The major advantage of laser oblation source 40 is that very high densities of neutral particles can be obtained. Additionally, target 44 for source 40 can be very small as the vapor from source 40 will readily expand into vapor plume 38 and plasma zone 22.

Figure 6:
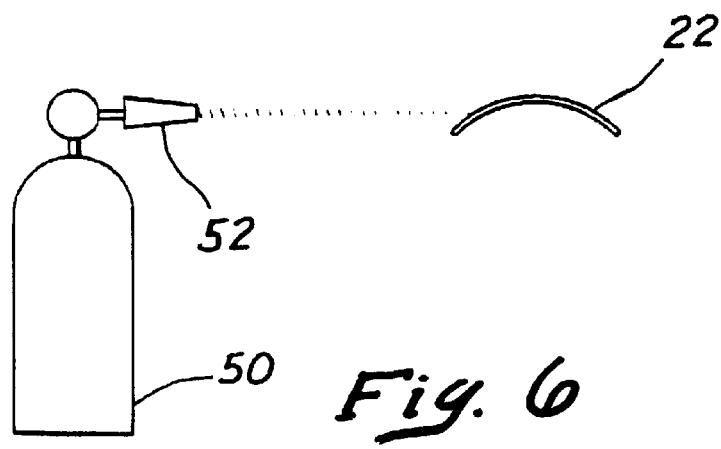
FIG. 6 is a diagram illustrating a gas source for an electron cyclotron resonant heating (ECRH) plasma source of the invention.

Another possible vapor source is an ECRH gas jet source generally denoted in FIG. 6 by reference numeral 48. In this embodiment, oven 30 is replaced by a source of gas 50 which is used to feed an injection nozzle 52 that directly injects the neutral particles into vapor plume 38 and ECRH zone 22. Because the plasma material must be originally available in a gaseous phase at room or operating temperatures, gas jet source 48 has a more limited range of materials available to it that can be processed. However, for those that can be provided in gaseous form, strong advantages exist. For example, the use of a gas jet source allows the actual source size to be very small. The small size of the gas source is important for some applications, particularly for some applications in isotope separation that use a magnetic mirror as a discriminator as described below.

Second, use of a gas jet source 48 allows control of the axial velocity at which the gas is injected into plasma chamber 11. Several applications call for control of the axial velocity as a controlled parameter. For example in the case of isotope enrichment, injecting the gas of the plasma material with a high velocity has some advantages, particularly where the axial velocity of the plasma is sufficiently high that problems with Doppler shift in the ICRH drive antenna system 35, 41 can be removed. In isotope applications where the mass difference in the atoms is small, it is necessary to operate with ICRH drive antennas 41 using a time derivative of the excitation magnetic field in enrichment region 14 to couple the ICRH power into the plasma uniformly. Antennas 41 generate a varying magnetic field B in the azimuthal direction. This requires a nonzero axial wave number, $k_z$, and therefore result in a Doppler shifted term in the drive of ICRH antennas 41, namely a frequency shift of $\omega - k_z v_z$. In general, the axial drift velocity, $v_z$, is simply a thermal drift and thus is on the same order as the thermal drift velocities in the plasma. This results in a mismatch in the coupling term. If $v_z$ is increased in excess of the thermal velocity, the matching conditions become better, at the expense of making the plasma chamber longer. The gas injection of FIG. 6 allows for this increase in $v_z$.

Finally, there are collector designs as described below that require lower or non-existent backscattered neutral particles and/or plasma. Lower or nonexistent back scattering can best be obtained if there is a high forward axial injection velocity from the plasma source.

Another major problem in the operation of any ECRH source is the routing of the microwave drive field and the breakdown of microwave windows that separate vacuum chamber 11 from microwave power source 29. This problem relates to the ability to couple sufficient power into the plasma to optimize chamber operation. In order to prevent break-down or formation of a plasma within the wave guides themselves, and hence short circuiting of the microwave waveguides, one of several conditions must be maintained. First, the gas pressure in the waveguide must be above or below a predetermined quantized level(s) or the electric field within the waveguide must be parallel to the magnetic field in the plasma chamber. These conditions must be met at the first resonance condition where the frequency of the ECRH drive equals the electron cyclotron frequency. In addition, all other harmonic resonance conditions or multiples of the electron cyclotron frequency must also satisfy the conditions to avoid breakdown within the wave guide.

Figure 7:
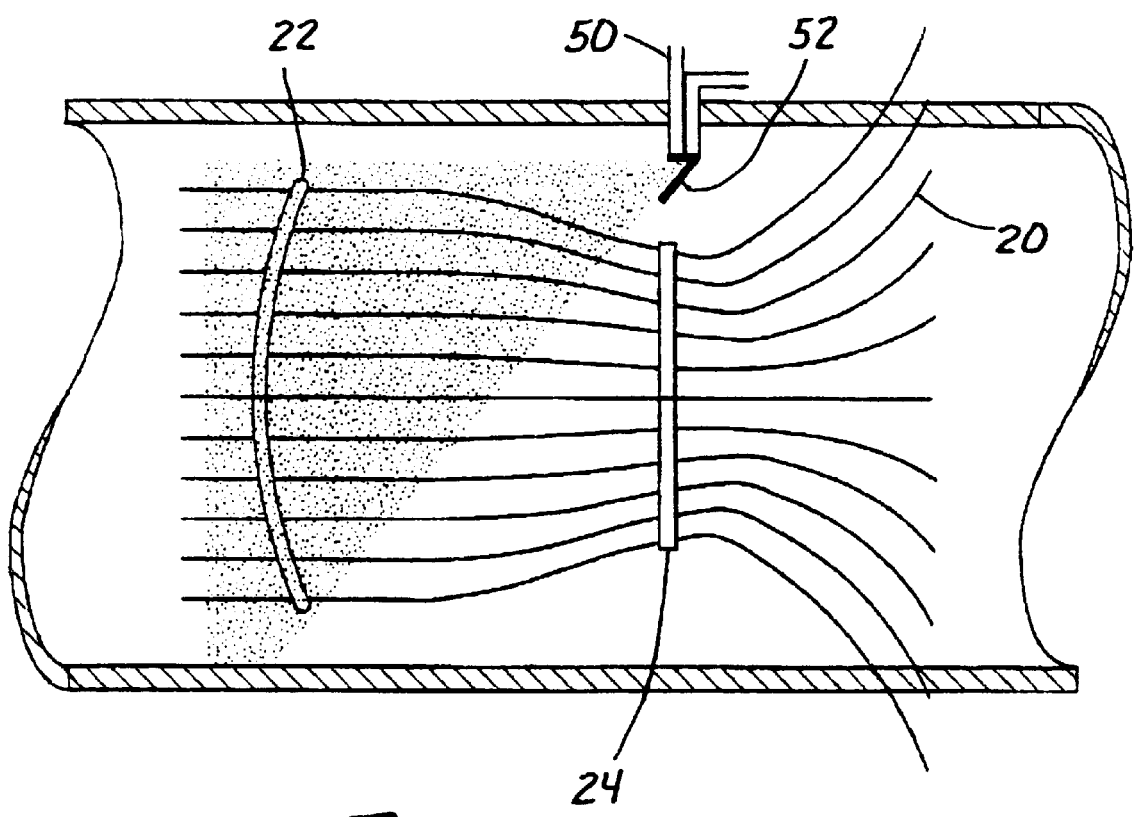
FIG. 7 is a diagram illustrating an improved microwave routing for the operation of an ECRH plasma source.

When using a high field source as shown in FIG. 3, the microwave feed to horn 26 can be directed according to the invention into chamber 11 as shown in FIG. 7 at a location just behind the plasma source or sputter plate 24. A small diverter or reflector 52 is then used to direct the microwaves into ECRH resonance zone 22. The arrangement of FIG. 7 has several advantages which include better access to the microwave components, such as the costly and delicate microwave windows that may need periodic servicing for optimal performance. Additionally, routing the microwaves perpendicularly into the source region 12 behind sputter plate 24 allows for the possibility of combining several microwave sources easily within the same plasma chamber 11 placed azimuthally about and/or longitudinally behind source region 12.

In the case of vapor sources, it has been demonstrated that according to the invention the microwave feed system can be located on the source end of the plasma chamber instead of on the collector side. For ancillary engineering reasons, this new locational design option presents a substantial cost reduction and simplification of the design of the plasma chamber.

Considering now the improved collection processes utilizing magnetic mirrors according to the invention. The present invention uses a collector system based on using magnetic mirrors to distinguish the particles with high perpendicular energy from those with low perpendicular energy as shown in the double mirror embodiment of FIG. 8 or the single mirror embodiment of FIG. 9. When a plasma particle travels from a low field region to a high field region, its particle energy and its magnetic moment are conserved. Conservation of magnetic moment requires that as the particle enters the high field region, its perpendicular velocity increases. This combined with the conversation of energy to cause the axial velocity of particle to decrease. If the increase in the field is sufficiently large, the particle will stop and reverse its direction or be reflected. The axial velocity of a particle entering a high field region is given by equations 2 below where $B_1$ is the low magnetic field and $B_2$ the high magnetic field.

$$v_{\|2}^2 = v_{\|1}^2 + v_{\perp 1}^2(1 - B_2/B_1) \qquad (2)$$

where $v_{\|1\ 2}$ is the velocity of the plasma particle parallel to axis 18 in the higher magnetic region, $v_{\|1}$ the velocity of the plasma particle parallel to axis 18 in the lower magnetic region, and $v_{\perp 1}$ the velocity of the plasma particle perpendicular to axis 18 in the lower magnetic region. If the mirror ratio, $B_2/B_1$, is fixed, particles of the sufficiently high perpendicular velocity will be reflected from the mirror, the particles of low perpendicular velocity will pass through the mirror.

In enrichment region 14 of PEP system 10, the perpendicular velocity of resonant ions is greatly increased while the parallel velocity remains unchanged. Consider for example PEP device 10 with magnetic mirrors on opposite ends of chamber 11 as shown in FIG. 8. By careful choice of the mirror ratio on the collector end of chamber 11, those resonant particles which have a higher perpendicular velocity will be reflected from the magnetic mirror. The nonresonant particles, however will travel directly through the mirror onto a dump plate 54 and be removed from the plasma. The degree of discrimination at mirror end 56 can be adjusted to be very good. This can be done because the average resonant particle has $\beta^2$ times more energy of the average nonresonant particle, where $\beta$ is the ratio between the orbit size of the resonant species and the nonresonant species.

The majority of nonresonant particles have left chamber 11 and the working plasma after the first transit across plasma chamber 11 and will be deposited on dump plate 54. The resonant particles, however, reflected from the collector end and travel backward through enrichment region 14. Here on return flight some of the particles will be decelerated and some of the particles will be accelerated by the ICRH excitation field depending on the phase at which the particles enter the ICRH excitation field. In either case, the particles reaching source region 12 will either be reflected there or absorbed back onto the cathode of the source.

In actuality, most resonant ions will be reflected at source region mirror 58. The reason for this is:
1. Extremely few particles will enter the enrichment region 14 exactly 180 degrees out of phase with the ICRH drive and therefore lose sufficient energy to pass through the source region mirror 58.
2. The source region mirror ratio can be adjusted to be higher than the collector side mirror ratio. A higher ratio will greatly increase the number of reflected ions.
3. The helical nature of the ICRH drive field will tend to prevent loss of all gained perpendicular energy during a backward transit of the enrichment region 14. As a result, the majority of resonant ions become trapped between source region 58 and collector region mirror 56. The nonresonant ions, however, simply pass through both mirrors and are collected on dump plate 54 or reintegrated into the source.

However, the resonant ions are not trapped forever between mirrors 56 and 58. Certain plasma effects and the effective scattering from enrichment region 14 causes radial transport of the resonant ions. These ions are then collected on a cylindrical collector ring or rings 60 positioned radially outside the radius of the main plasma in chamber 11. The ring collector is a metallic cooled ring located outside of the normal radius of the plasma. The exact z-axis location of the ring is not particularly significant not is the width of the ring. The best location for the ring, however, is as far away from the source as possible, but still in the uniform field region. This allows the ring to collect plasma, but minimizes the neutrals collected by the ring. Generally, the width of the ring would be fairly wide to allow a greater collection surface area.

The basic principle is to collect particles that move outside of the normal radius of the plasma column. Since these particles are outside the plasma column, they must have been subjected to radial transport, which means that they must have been reflected by the mirrors in order to make many transits across the device. Hence they should be resonant particles.

The second configuration is a single mirror design of FIG. 9. In the device of FIG. 9, plasma is created as source region 12 and flows through enrichment region 14. In enrichment region 14 the resonant species is accelerated preferentially over all nonresonant species. On the opposite end of device 10, namely the collection end, a magnetic mirror 61 formed by mirror coil 63 configured according to the invention is used to reflect the resonant particles while the nonresonant particles travel through mirror 61 and are collected on dump plate 54. The exact value of the mirror depends on the magnetic field heating, and several other parameters. The shape of the mirror field is only important in the sense of generating a magnetic mirror that functions as a mirror. This technology is well known in the art. See, Status of Mirror Fusion Research 1980, Lawrence Livermore National Laboratory, UCAR 10049-80-Rev.1, incorporated herein by reference. An example of an actual mirror calculation for a specific geometry would for low laboratory energies be as follows. Assume a plasma with an axial drift energy of 2 eV. Further assume that coming out of the enrichment region, the nonresonant species has s perpendicular energy of 4 eV and the resonant species has an energy of 16 eV. The mirror ration required to reflect the particles are 1.50 and 1.25 for nonresonant and resonant particles respectively. Choosing a mirror ratio around 1.3 or 1.35 would allow all nonresonant particles to pass through he machine, but would reflect almost all resonant particles.

The reflected resonant particles travel back through chamber 11 and are collected on a product plate 62. The plasma is introduced through a orifice or orifices defined through product plate 62, such as by a gas injector 64. In order for the single mirror configuration of FIG. 9 to operate some conditions must be met. First, the operation of the source and collector assemblies must not interfere with each other. In the preferred embodiment plasma is injected through injector 64 in the form of a vapor with a high axial velocity from the small or plurality of small apertures defined through product plate 62. A high velocity is used to eliminate back scattered particles that would otherwise be collected by the collector assembly. An additional plus is gained in this type of source in that the axial velocity of the plasma is more uniform, which allows better coupling to ICRH antennas 41 as described above in connection with the Doppler shift.

There are several other alternatives for preventing interference between source region 12 and the collection region 16 or process even though both occur in the same end of chamber 11. In particular, a conventional shield-slat product collector can be used to prevent collection of back scattered plasma, if the source is located in front of the collector as diagramatically depicted in FIG. 10. ECRH zone 22 provides, for example, directly back scattered ions on paths 66 and 68. A low energy ion on path 66 will hit one of a plurality of shield elements 70 and therefore will not form part of the collected product. A back scattered low energy ion on a path 68 penetrates through one of a plurality of apertures 72 defined through shield 70 and impinges on a dump plate 74 disposed further behind shield 70. This particle too is therefore removed from the product collection. Meanwhile, high energy or resonant ions from enrichment region 14 return on paths 76 and 78. The resonant ion spiraling on path 78 impinges upon shield 70 and is collected along with the back scattered tailings. A resonant ion spinning on path 76 impinges through opening 72 and, because of its perpendicular helical velocity, impinges upon and is collected on one of a plurality of collector plates 62 disposed behind shield 70 and provided as concentric azimuthal cylindrical-sectioned rings.

A basic problem with single mirror systems is the interference of the plasma source with plasma which is returning toward the collector. One solution is to attempt to prevent back scatter of the plasma from the source into the collector. When the plasma is ionized, the temperature of the gas increases from room temperature to around 1 eV or 11,000° C. This results in a tremendous increase in the pressure which tends to drive the plasma back toward the collector. Several methods can be used to prevent this. As discussed in this specification is the injecting of the plasma material from the source at high speeds. The second is the use of a back pressure plasma. A back pressure plasma is a plasma which is generated between the source region and the collector in a single mirror system. This back pressure plasma is generated warm, probably from a flare in the magnetic field using another ECRH source. The back pressure plasma has a higher pressure than the working plasma, because of a higher temperature, thus it prevents the working plasma form baking up into the source. The gas used in the back pressure region must not interfere with the collection process or the enrichment process, since it will get into the uniform field region. Hence, He is preferred for use in the back pressure plasma.

Figure 11:
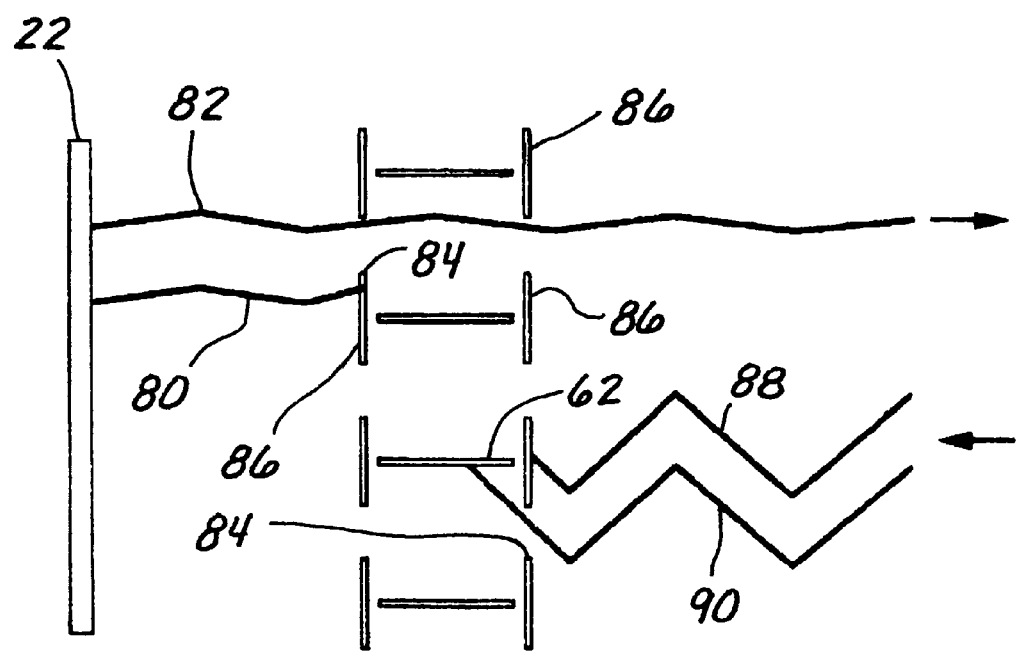
FIG. 11 is a schematic illustrating a collector assembly used in front of the source for use in connection with the plasma's chamber of FIG. 9.

An alternative collector system is described in connection with FIG. 11. Here a slate and shield collector is provided in front of ECRH zone 22 to simply block back-scattered plasma from being collected onto the product plates 62. For example, low energy ions directly scattered from source 22 on paths 80 and 82 either proceed through apertures 84 through the collector and continue on to enrichment region 14, or impinge upon vertical shields 86. Return high energy or resonant ions from enrichment region 14 on paths 88 and 90 either impinge upon shield 86 or pass through apertures 84 to be collected on cylindrical ring collector plates 62.

Figure 12:
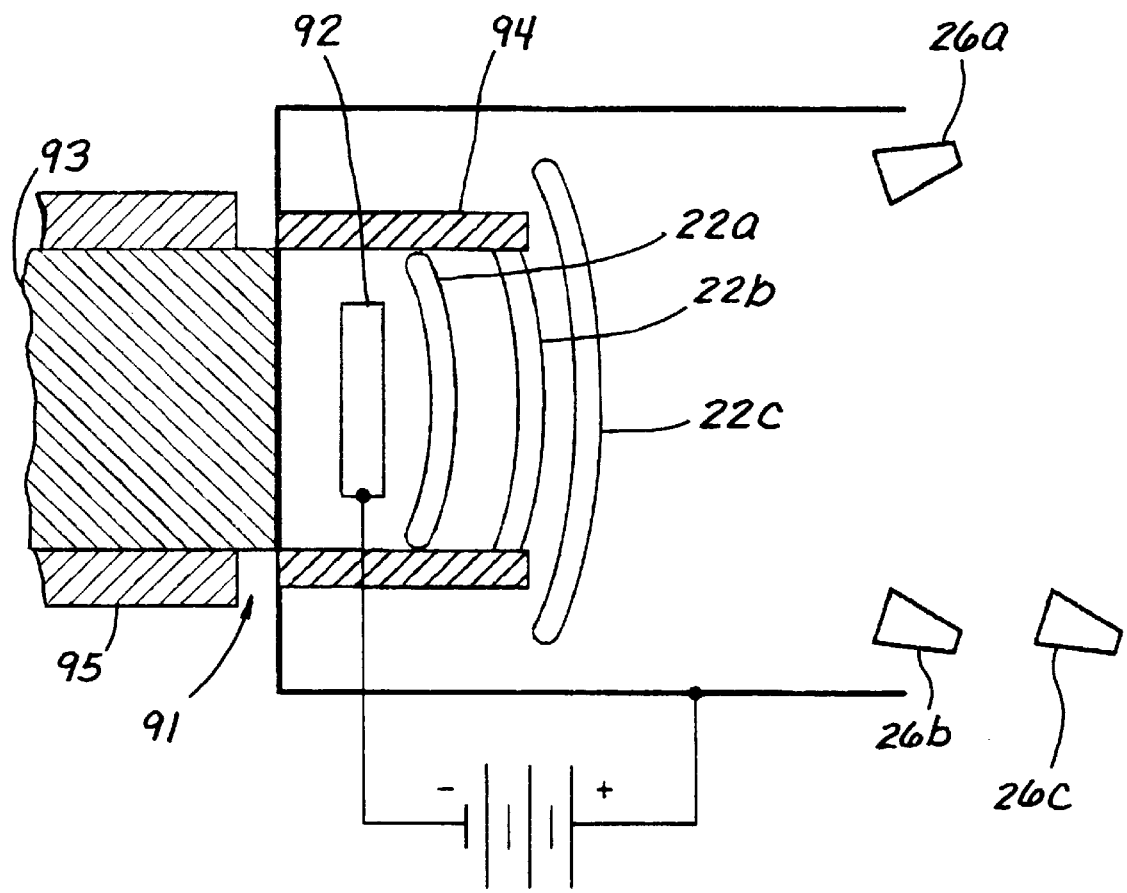
FIG. 12 is a schematic diagram illustrating improvements arising by virtue of the creation and use of multiple ECRH zones.

For many applications it is necessary or desirable to have control over the shape of ECRH zone 22. This requirement may arise from a need to minimize the number of neutral particles, or from cases where a single ionization state is required. Control over the ionization state in the prior art was obtained by increasing the power in the ECRH ionizer zone 22. This allows a decrease in the number of neutral particles, but also tends to increase the number of secondly or thirdly ionized particles in the systems. To overcome this defect, the system of FIG. 12 has been devised according to the present invention in which a multiple of ECRH zones 22$a$, 22$b$ and $c$ are provided over which much better control of the ionization state the plasma is obtained. The system of FIG. 12 is used to remove virtually all the neutral particles from the system. For example in the illustration of FIG. 12 a biased source plate 92 is used as a sputter source in combination with a heated iron cathode 93 heated by source coil 95. A conventional sputter supply 91 is provided for biased sputter plate 92. Sputter plate 92 is shielded by baffles 94 which form a concentric circle or ring about plate 92 to block neutral particles from scattering into plasma chamber 11. A primary ECRH horn 26$a$ is provided as described above to create a corresponding primary ECRH zone 22$a$ within baffle enclosure 94 in combination with an appropriate magnetic field set up within the plasma chamber. Secondary ECRH horns 26$b$ and $c$ are also provided for creating corresponding secondary ECRH zones 22$b$ and $c$.

Therefore, instead of increasing the power in ECRH zone 22$a$, a number of different ECRH zones 22$a$, $b$ and $c$ at different frequencies are employed. Each of these ECRH zones 22a, b and c are tuned to frequency which causes them to be located at slightly different locations within the plasma chamber as determined by the resonance condition with the magnetic field. Using this technique, broad resonance regions with moderate or even shaped energies can be constructed as opposed to a single narrow zone of high energy. A widening of the ECRH zone is therefore possible which results in turn in the preferential creation of a single ionization state plasma.

Sputter sources have been constructed for a number of materials. These sources produce plasmas that are ideal for isotope enrichment, plasma processing deposition and the like. ECRH-sputter plasmas are normally limited to solid metals or conductive materials. However, according to the invention a number of methods are provided to generate ECRH-sputter plasmas from nonmetallic compounds. The principal problem working with nonmetallic sources is that they their lack of conductivity prevents the application of an electric potential from being applied to the source plate sufficient to attract ions to the plate where they will sputter off neutral particles. The problem in conventional sputter plates is that as the ions hit the surface they leave a positive charge that has no way to escape. Therefore, the surface eventually charges up to a sufficiently high level to block the ion flow or arcing will occur in the plate resulting in a nonuniform plasma.

Figure 13:
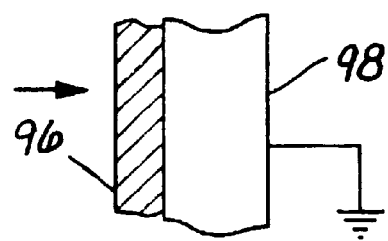
FIG. 13 is a cross-sectional diagram of a sputter plate for use with nonconducting plasma materials.
Figure 14:
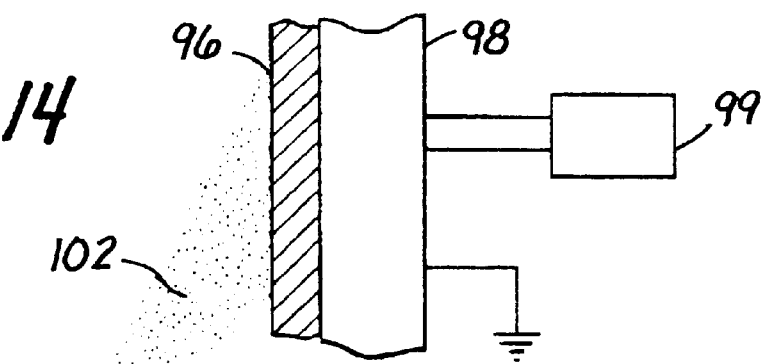
FIG. 14 is a cross-sectional diagram of a sputter plate for use with nonconducting plasma materials wherein the material coating is continuously refreshed.

According to the invention, ions are attracted to the sputter surface by a strong negative potential applied to a conductive plate 98 behind a thin nonconducting coating 96 as shown in FIG. 13. If only a limited amount of material is required from the sputter source, the sputter material can be applied in a thin layer to the surface of the metal plate, such as a thickness in the order of 1.58 microns. The composition of metal plate 98 beneath thin coating 96 is chosen for its sputter capabilities and its low metal contamination of the plasma. One such material is $MoO_3$. The thickness of coating 96 is comparable to the ion implementation depth, $\delta$, of ions into coating 96. The excess charge carried by 20 the sputter ions can then be bled off to metal plate 98 and to ground thereby preventing any substantial charging.

A limitation of thin surface coating 96 as described above is that only limited amounts material at a time can be provided to the plasma. For many materials this can be remedied by constantly refreshing the thin surface layer at a rate equivalent to which it is being removed by the plasma or sputtering. This also has the advantage that a thinner surface layer can be used without limiting operating time. In this embodiment, surface layer 96 is replenished by use of a thermal oven 100 used to evaporate a source material into a jet 102, which is then directed onto the source plate surface 96. Plate 98 is thermally cooled by a conventional cooling system 99 to improve condensation of the vapor material onto coating 96 and also for control and optimization of general sputter characteristics.

A small amount of highly sputterable material can also be disposed in plate 98 for use in feedback control of oven 100. If any of this trace material is detected in the plasma, then the oven temperature needs to be increased, indicating that coating 96 has become too thin. If a dip in the plasma density is detected, which indicates that coating 96 is too thick, then the oven temperature needs to be decreased.

In another embodiment, the entire source plate is made of nonconducting material, but has a doping material embedded into plate 104. The doping material is conductive and is used as the carrier to shed excess charge. The doping material is chosen according the particular nonconducting source material used in the plasma, since the doping compound will necessarily be incorporated into the plasma. Finding a correct material mix for doping a plate involves find a metal material that will bond with the insulator and that will not interfere with the enrichment process. Generally lighter metals work better, because they have less of an affect on the enrichment process. Doped plates have been constructed with $MoO_3$, which is an insulator and Mo as the conductive material. In this case Cu or W would also provide ideal conductor materials. Homogeneously doped plate 104 may also take the form of a filled plug which mounted on a rotatable carousel so that when depleted, a substitute plug is rotated into position to provide a new source of plasma material.

System parameters must be monitored and controlled in the operation of plasma device 10. The present device 10 is provided with a computer controlled system which allows operation with minimal operator intervention. As diagramatically shown in FIG. 16 a computer 106 is coupled to each of the operating subsystems of device 10 as described in connection with the embodiments of FIGS. 1 and 8, including source and mirror coils 114 and 116 respectively, their power supplies 110 and 112 respectively, and to a plurality of monitors 108. For example, monitor 108 may include a subsystem for using laser induced fluorescence (LIF) to tune the resonance conditions within the plasma. Computer 106 is capable of responding to variations in any one of the source or plasma parameters and handling most system problems directly without operator intervention. When computer 106 is unable to solve a problem according to prestored responses, the operator is then called and processing suspended. The computerized PEP system is sufficiently automated to allow normal operation without an operator except for changing the source and/or collector systems as they become deleted or filled.

The computer system allows control of the entire system with minimal operator input. The heart of the system is the module the monitors the efficiency of the separation shown in FIG. 17a. This is the key module because it directly measures the quality of the end product. Central to this module are inputs form both sensors for laser induced florescence (LIF) and an ion radial energy analysis (IREA) included in the system (not shown). When combined these measurements allow real-time measures of the separation efficiency. These in turn are used to control the parameters of the rest of the system. A number of parameters are monitored in various modules as will be described in connection with FIGS. 17 a–e. If the system develops a problem that it cannot correct with any of these parameters, the system will shut down and call for operator intervention.

Figure 16:
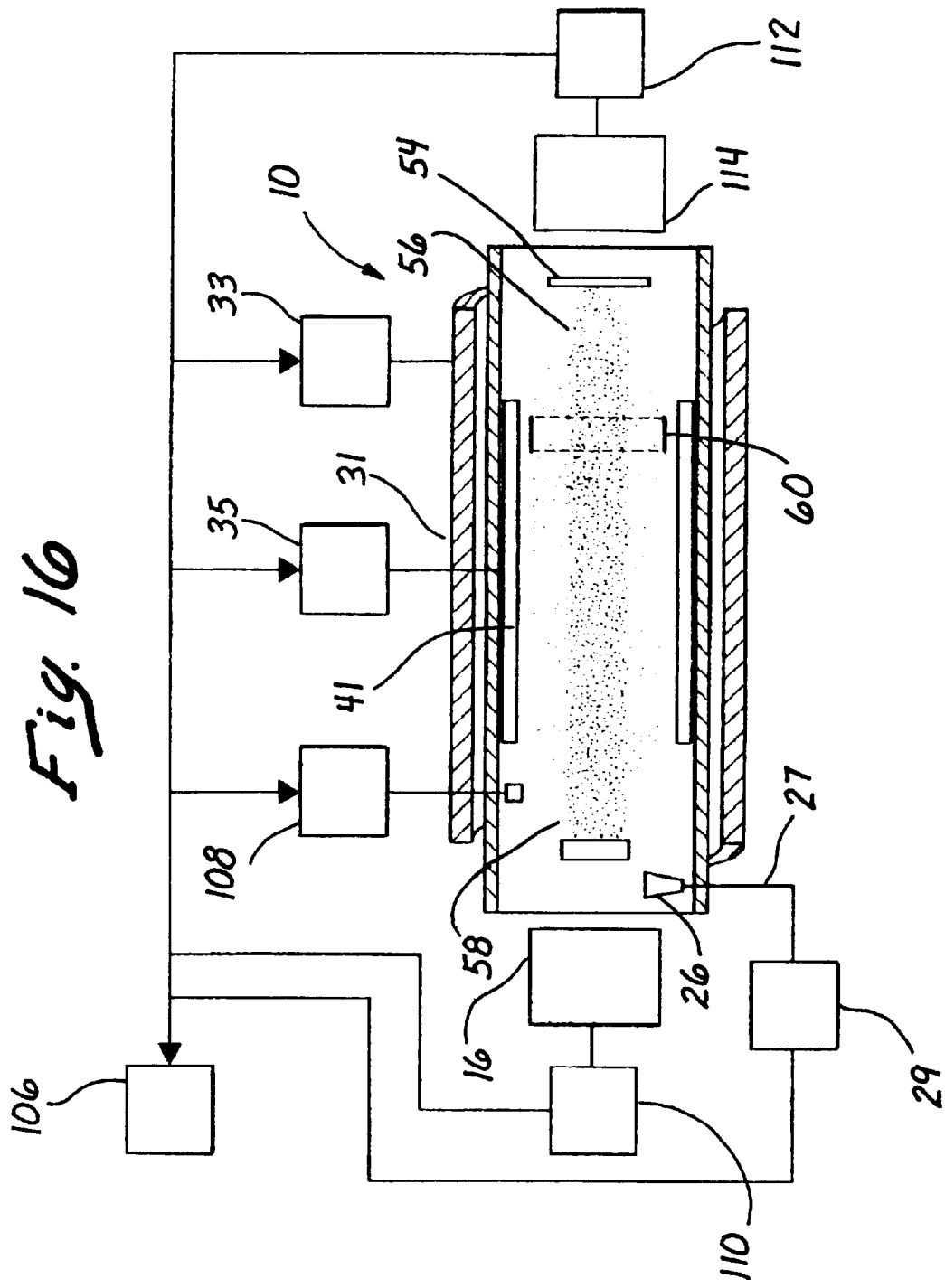
FIG. 16 is a block diagram illustrating the computerized automation of a PEP system according to the invention.
Figure 17A:
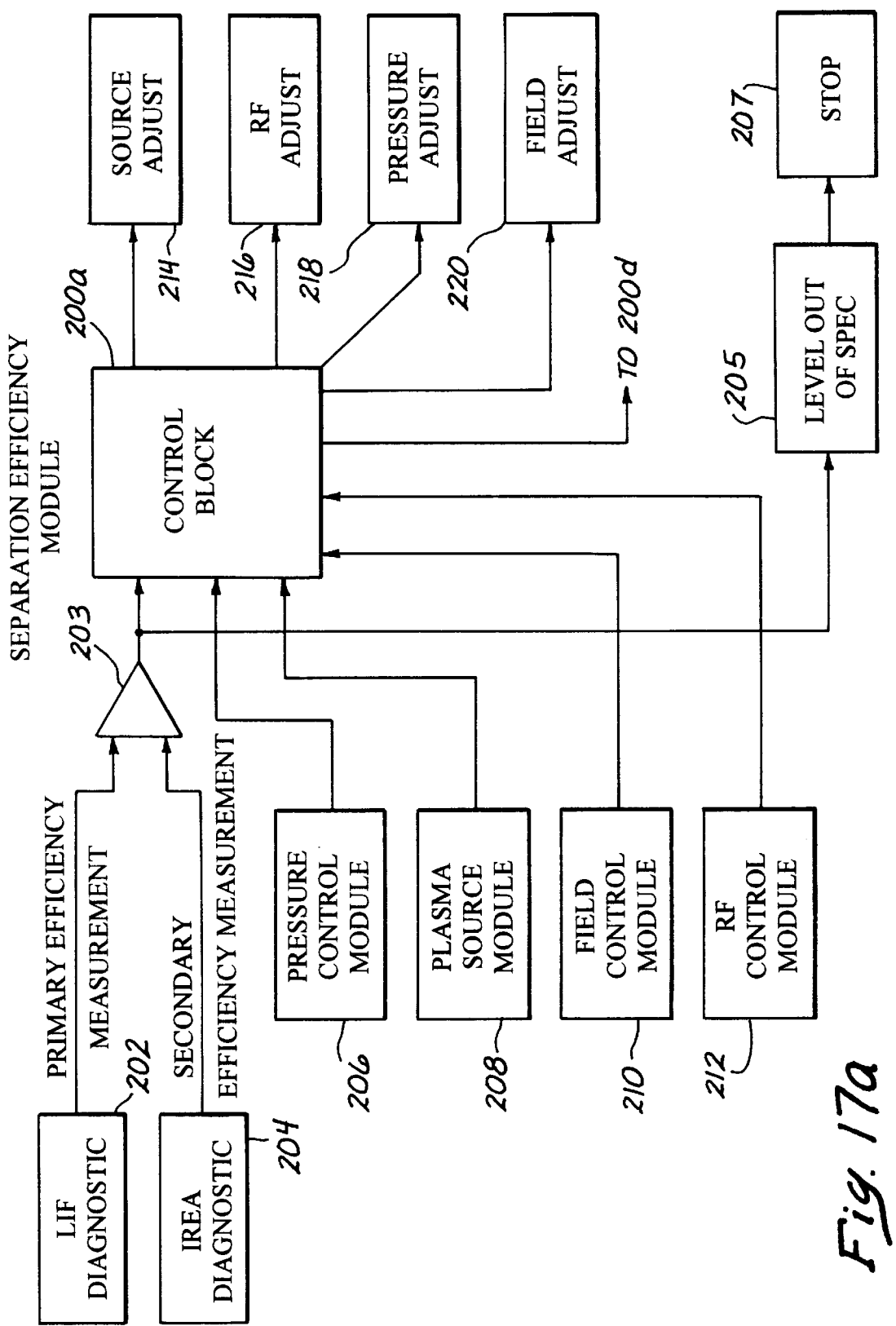
FIG. 17a is a block diagram illustrating the computerized automation of the PEP system of FIG. 16 according to the invention as implemented in the separation efficiency module of the software.

The hardware/software automation of the computerized PEP system is illustrated in FIGS. 17a–e which depict hardware and software modules for running the system of FIG. 16. Although interconnected to each other and through common data lines or sensors, the software architecture of each of the modules of FIGS. 17a–e operate independently from each other. For the purposes of this illustration, control block 200a includes controls 200b–e in addition to having a control function which is separate and unique to separation efficiency. The modules typically run within a single computer or may be distributed among several separate interconnected computers. FIG. 17a includes a central control block 200a which is coupled to and monitors primary separation efficiency measured by LIF sensor 202 and secondary separation efficiency measured by IREA sensor 204. Pressure control modules 206, described in greater detail in FIG. 17c, coupled to control block 200a sense and monitor the amount of vacuum pressure within the plasma chamber at one or more sites. Plasma source modules 208, described in greater detail in FIG. 17*b,* coupled to control block 200*a* sense and monitor parameters connected with the plasma source, such as the plasma oven. Field control modules 210, described in greater detail in FIG. 17*d,* coupled to control block 200*a* sense and monitor parameters connected with the magnetic coils that surround the chamber to form the various field that shape the plasma within the chamber including the magnetic mirrors. RF control modules 212, described in greater detail in FIG. 17*e,* coupled to control block 200*a* sense and monitor parameters connected with the RF field which is coupled into the plasma to drive the resonance and ultimately the separation of the isotopes.

The primary and secondary efficiency measurements are digitized by signal conditioning circuit 203 and provided as an input to control block 200*a.* Depending on the isotope being separated, the weighting between the digitized primary and secondary efficiency measurements for purposes of process control will be varied in control block 200*a.* The output of circuit 203 is also coupled to a level output specification monitor 205. If the efficiencies should go out of range, then a stop or shut-down procedure is executed by module 207.

According to a prestored program in or communicated to control block 200*a,* if any combination of parameters in modules and sensors 202–212 should approach or fall out of range, control block 200*a* generates an adjustment signal to make the needed combination of corrections. Source adjust modules 214, described in greater detail in FIG. 17*b,* are coupled and respond to control block 200*a* to make the necessary adjustments to the plasma source. RF adjust modules 216, described in greater detail in FIG. 17*e,* are coupled and respond to control block 200*a* to make the necessary adjustments to the RF source or fields. Pressure adjust modules 218, described in greater detail in FIG. 17*c,* are coupled and respond to control block 200*a* to make the necessary adjustments to the vacuum pressures within the chamber. Field adjust modules 220, described in greater detail in FIG. 17*d,* are coupled and respond to control block 200*a* to make the necessary adjustments to the magnetic field sources used in association with the system.

Figure 17B:
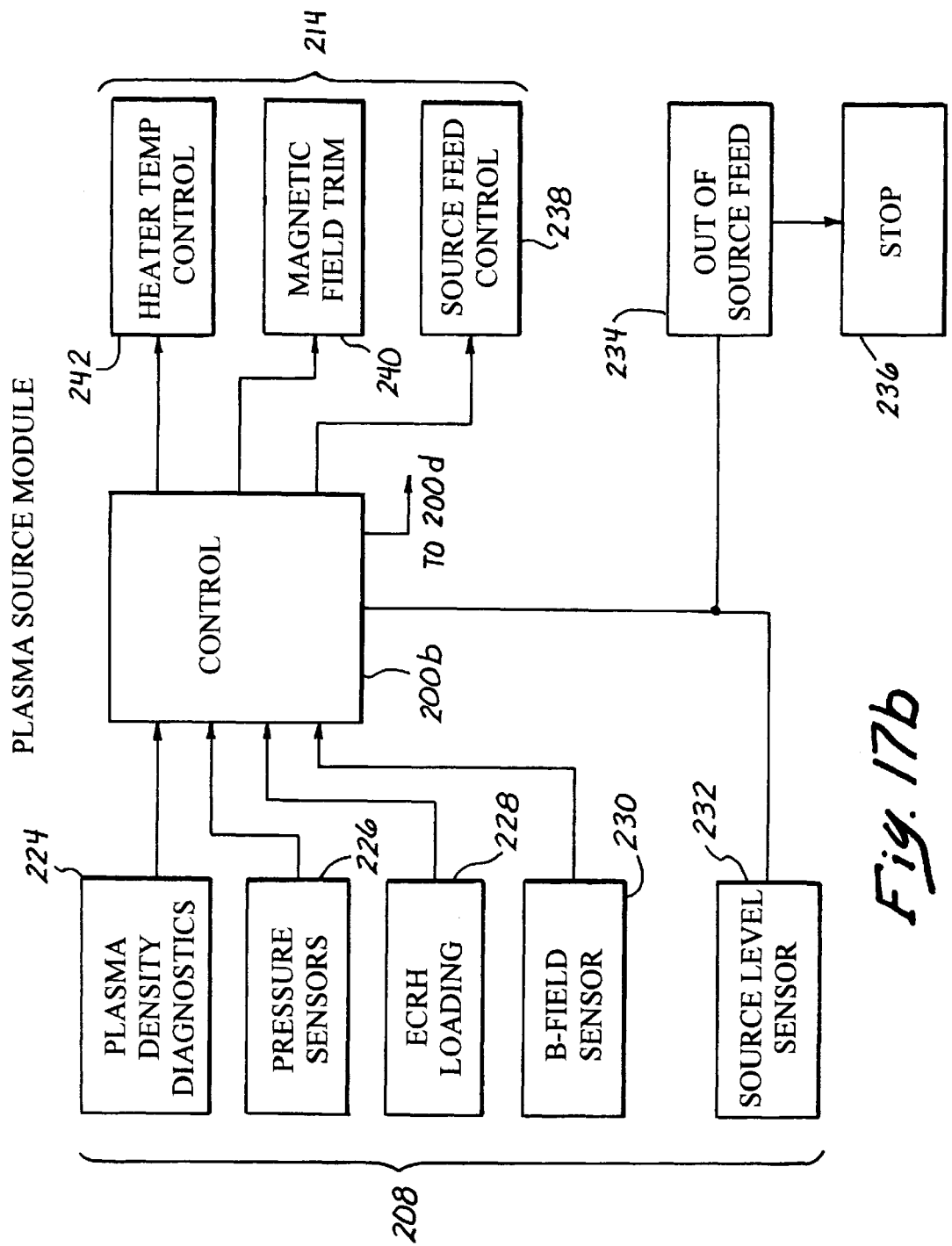
FIG. 17b is a block diagram illustrating the computerized automation of the PEP system of FIG. 16 as implemented in the plasma source module of the software.

Turn now to FIG. 17*b* wherein plasma source modules 208 are shown in greater detail. Control block 200*b* receives inputs from a plasma density diagnostic module 224, which measures and computes the plasma density at selected locations within the chamber. Source pressures are coupled to control 200*b* from vacuum pressure sensors 226 distributed at relevant measurement points in or near the plasma source or sources. ECRH loading is measured, computed and coupled to control 200*b* by ECRH loading module 228. The magnetic field at relevant points near the source(s) is sensed by module 230 and coupled to control 200*b.* Finally the level of source material available for plasma generation is monitored by source level sensor 232 and coupled both to control 200*b* and to a source feed module 234, which initiates an out-of-feed routine. One result of this routine is to activate stop module 236, which will shut the system down taking the appropriate shut down action depending on the type of error.

In response to these inputs, control 200*b* provides response signals to source adjustment modules 214 also depicted in more detail in FIG. 17*b.* Heater temperature module 242, magnetic field trim module 240, and source feed control module 238 are each coupled to and controlled by control 200*b.* Through modules 238–242 plasma source rate feeds, source fields and source temperatures are responsively controlled respectively.

Figure 17C:
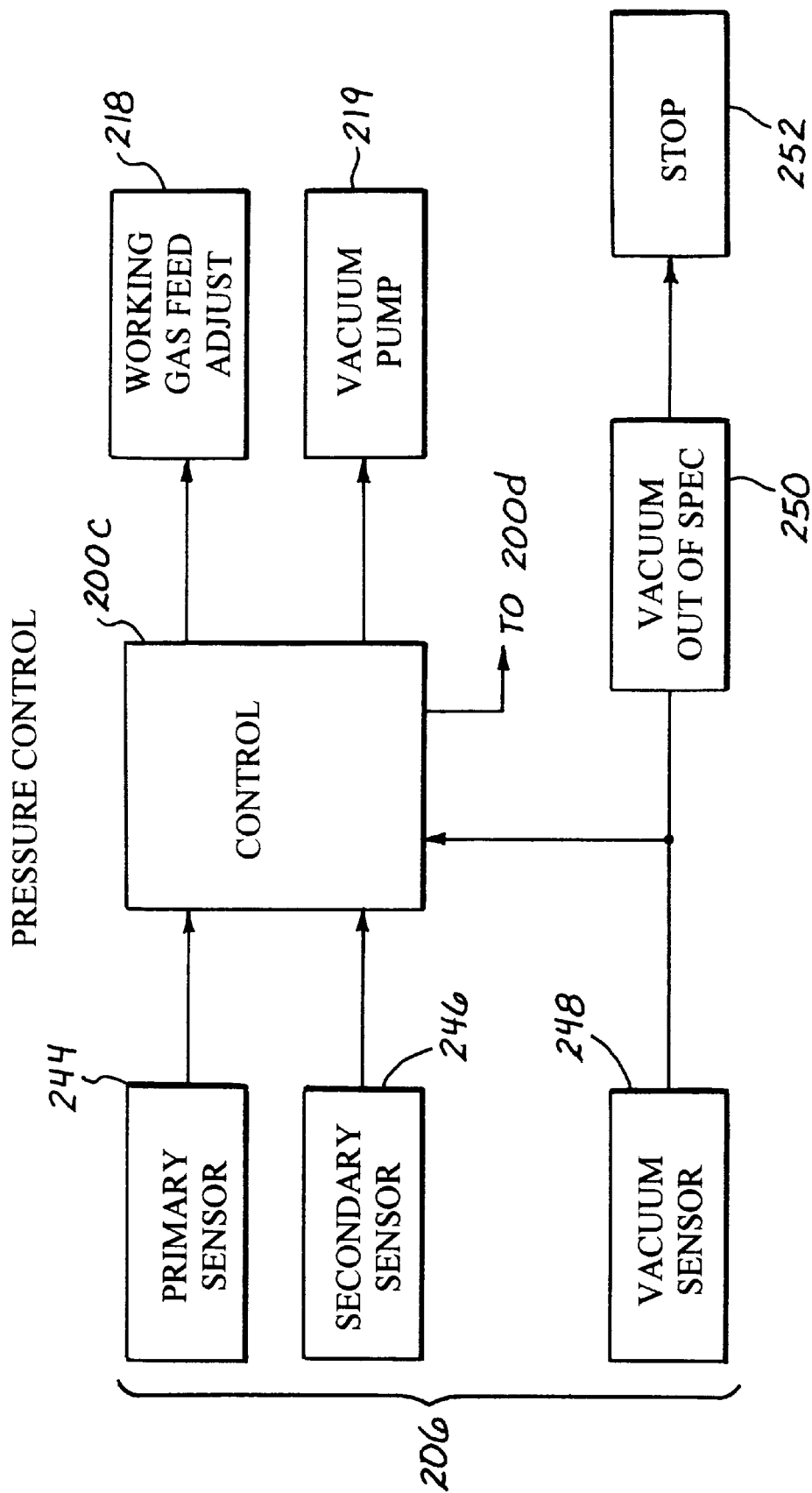
FIG. 17c is a block diagram illustrating the computerized automation of the PEP system of FIG. 16 as implemented in the pressure control module of the software.

FIG. 17*c* depicts in greater detail the coupling of pressure modules 206 to control 200*c.* A primary sensor 244 and one or more secondary pressure sensors 246 are coupled to and provide selected gas pressures related to the plasma source to control 200*c* along with a vacuum sensor 248 for the vacuum pumping system itself. Vacuum sensor 248 is also coupled to a vacuum monitor 250, which determines if the chamber vacuum goes out of specification. If so, then an appropriate stop routine is activated by module 252. Control 200*c* in turn sends correction signals to a working gas feed adjustment module 218 to adjust any variations in the gas feed to the source that may be required and to vacuum pump controller 219 to undertake any needed corrective actions in the vacuum pumping system.

Figure 17D:
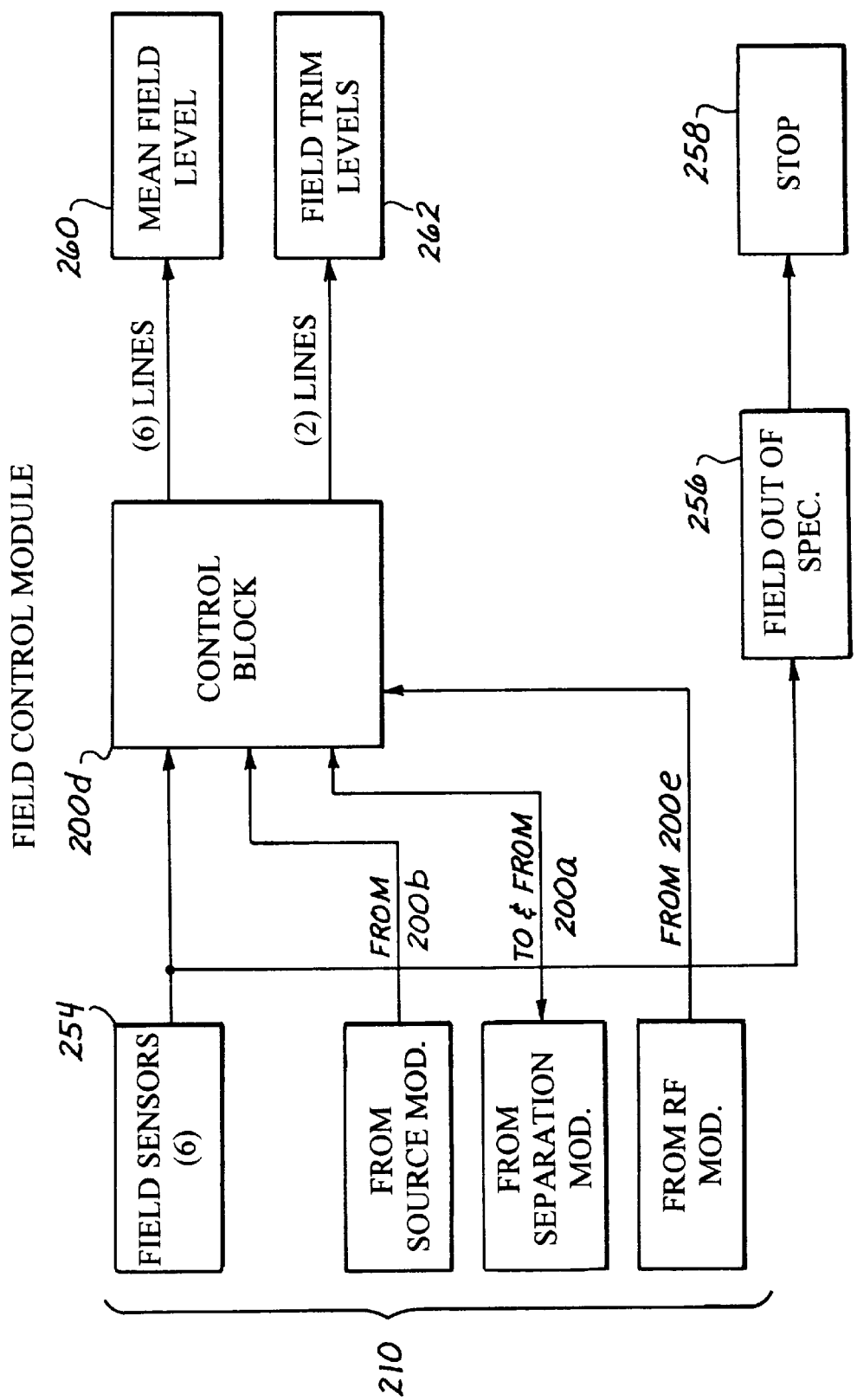
FIG. 17d is a block diagram illustrating the computerized automation of the PEP system of FIG. 16 as implemented in the field control module of the software.

FIG. 17*d* depicts field sensors 210 in greater detail. A plurality of field sensors 254 measure the electromagnetic field in the chamber at selected locations and communicate the measured field to control 200*d.* In the preferred embodiment six magnetic field sensors are placed at selected locations in the chamber. Magnetic field corrections are also coupled to control 200*d* from control 200*b* in the plasma source module of FIG. 17*b,* control 200*a* in the separation efficiency module of FIG. 17*a,* and control 200*e* in the RF module of FIG. 17*e* so that field adjustments are made in response to inputs and process control of these modules as well. In the case of control 200*a,* input from the field control module of FIG. 17*d* and process control from control 200*d* can also be communicated back to control 200*a* of FIG. 17*a* for use in separation efficiency corrections.

Field sensors 254 are also coupled to field-out-of-specification module 256 which determines when the magnetic field at selected locations varied unacceptably from design tolerances. When this occurs stop module 258 is activated to initiate the appropriate shut-down routine.

Control 200*d* has its outputs coupled to a mean field level controller 260 which is used to selectively adjust the magnetic field of various coils used in the system. In the illustrated embodiment six such coils are controlled, each of which is monitored by a separate field sensor 254. Similarly, control 200*d* drives a field trim level controller 262 to make finer adjustments in trim coils, of which the illustrated embodiment has two.

FIG. 17*e* depicts the RF control module in which control 200*e* has inputs from separation sensors 202 and 204 described in connection with FIG. 17*a,* field sensors 254, described in connection with FIG. 17*d,* antenna sensors 264 and an RF loop 266. Antenna sensor 264 monitors the signals on the ICRH antennas for heating said plasma in the enrichment region. RF loop 266 independently monitors the RF cyclotron field in the chamber. Control 200*3* processes the inputs to generate an output command to an RF level adjustment controller 272 and to an RF frequency adjustment controller 274 as needed by prestored design parameters. The RF level and frequency adjustment signals from control 200*e* are monitored by out-of-specification module 268, which in turn activates stop module 270 to initiate an appropriate shut-down routine in the event that the RF signals are out of tolerance.

Typically, plasma chambers are built horizontally with both the main component of the chamber of the magnetic field laid in a horizontal direction as shown in FIG. 1. In the preferred embodiment, plasma device 10 is oriented vertically as shown in FIGS. 8 and 9, whereby a number advantages are realized. In particular, in such a device a thermal vapor source can be built without an oven, simply by heating a boat of material to a high enough temperature allowing the vapor to drift upwardly into ECRH zone 22.

In addition, it is possible to build an ECRH sputter source from material that could not be used in a horizontal configuration. This is especially true for materials with a very low melting point, which material would liquefy and run out of a sputter plate in the normal horizontal configuration. In the conventional horizontal configuration, the source plate must be cooled and in some cases cannot be constructed at all, because it is impossible to keep it from melting or sagging. However, in a vertical configuration of device 10, liquid ECRH sputter sources are easily constructed, being contained by an appropriate boat or crucible, but otherwise having a structure substantially identical to their solid or cooled counterparts used in the conventional horizontal configuration.

Although the present invention has largely been described in the context of isotope enrichment, it must be particularly understood that the teachings of the invention with respect to plasma sources apply to all types of plasma processing including production of ECRH plasma for plasma coatings, plasma etching and the like.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. An improvement in a plasma chamber having a source region and an enrichment region contained within said plasma chamber, said source region provided with a plasma source for producing a plasma, said improvement comprising:

a magnet assembly for generating a shaped magnetic field in said plasma chamber wherein said shaped field provides a higher magnetic field intensity in said source region than in said enrichment region so that as said plasma flows from said source region to said enrichment region, plasma temperature in a direction perpendicular to said magnetic field decreases, wherein said high field region comprises a magnetic mirror for discriminatory separation of isotopes of said plasma, wherein said plasma chamber is provided with a product plate and a dump plate, and wherein said magnetic mirror is disposed within said plasma chamber on the end of said plasma chamber opposing said source region so that nonresonant ions are discriminatorily disposed on a dump plate disposed behind said magnetic mirror and resonant ions are reflected to said opposing end of said plasma chamber and deposited on a product plate.

2. An improvement in a plasma chamber having a source region and an enrichment region contained within said plasma chamber, said source region provided with a plasma source for producing a plasma, said improvement comprising:

a magnet assembly for generating a shaped magnetic field in said plasma chamber wherein said shaped field provides a higher magnetic field intensity in said source region than in said enrichment region so that as said plasma flows from said source region to said enrichment region, plasma temperature in a direction perpendicular to said magnetic field decreases; and a plasma injector and wherein said plasma is injected through said product plate, wherein said high field region comprises a magnetic mirror for discriminatory separation of isotopes of said plasma;

wherein said plasma chamber is provided with a product plate and a dump plate, and wherein said magnetic mirror is disposed within said plasma chamber on the end of said plasma chamber opposing said source region so that nonresonant ions are discriminatorily disposed on a dump plate disposed behind said magnetic mirror and resonant ions are reflected to said opposing end of said plasma chamber and deposited on a product plate; and wherein said enrichment region includes ICRH antennas for heating said plasma in said enrichment region and wherein said injector injects said plasma at a high axial velocity into said plasma chamber to reduce backscattered particles and improve coupling to said ICRH antennas.

3. An improvement in a plasma chamber having a source region and an enrichment region contained within said plasma chamber, said source region provided with a plasma source for producing a plasma, said improvement comprising:

a magnet assembly for generating a shaped magnetic field in said plasma chamber wherein said shaped field provides a higher magnetic field intensity in said source region than in said enrichment region so that as said plasma flows from said source region to said enrichment region, plasma temperature in a direction perpendicular to said magnetic field decreases, wherein said high field region comprises a magnetic mirror for discriminatory separation of isotopes of said plasma; and wherein said collector is disposed behind said plasma source, said collector comprising a dump plate for back-scattered ions and a slat-and-shield assembly for collection of resonant ions.

4. An improvement in a plasma chamber having a source region and an enrichment region contained within said plasma chamber, said source region provided with a plasma source for producing a plasma, said improvement comprising:

a magnet assembly for generating a shaped magnetic field in said plasma chamber wherein said shaped field provides a higher magnetic field intensity in said source region than in said enrichment region so that as said plasma flows from said source region to said enrichment region, plasma temperature in a direction perpendicular to said magnetic field decreases, wherein said high field region comprises a magnetic mirror for discriminatory separation of isotopes of said plasma; and wherein said collector is disposed in front of said plasma source region and is comprised of a double shielded slat-and-shield assembly to permit transmission of low energy ions from said plasma source therethrough and to permit collection therein of high energy resonant ions from said plasma enrichment region .

5. An improvement in a plasma chamber having a source region and an enrichment region contained within said plasma chamber, said source region provided with a plasma source for producing a plasma, said improvement comprising:

a magnet assembly for generating a shaped magnetic field in said plasma chamber wherein said shaped field provides a higher magnetic field intensity in said source region than in said enrichment region so that as said plasma flows from said source region to said enrichment region, plasma temperature in a direction perpendicular to said magnetic field decreases;

wherein an electron cyclotron resonant heating (ECRH) zone is provided in said source region, said ECRH zone being in said higher magnetic field intensity provided in said source region so that as said plasma flows from said source region to said enrichment region, plasma density decreases, and further comprising a plurality of ECRH microwave horns coupled to a corresponding plurality of microwave energy sources, each of said ECRH horns establishing separate ECRH zones in said source region adjacent to each other so that the ionization state of said plasma generated within said multiple ECRH zones is controllable.

6. The improvement of claim 5 wherein each of said ECRH horns provide energy to said corresponding ECRH zones at different tuned frequencies at different locations within said plasma chamber as determined by the resonance condition with said magnetic field to create a broad ECRH zone with shaped energy distribution therein.

7. An improvement in a plasma chamber having a source region and an enrichment region contained within said plasma chamber, said source region provided with a plasma source for producing a plasma, said improvement comprising:

a magnet assembly for generating a shaped magnetic field in said plasma chamber wherein said shaped field provides a higher magnetic field intensity in said source region than in said enrichment region so that as said plasma flows from said source region to said enrichment region, plasma temperature in a direction perpendicular to said magnetic field decreases, wherein said plasma source is a sputter source of nonconductive material comprising a thin coating of said nonconducting material disposed on and electrically coupled to a conductive backing plate, thickness of said coating being comparable to the ion implantation depth for incoming ions impinging on said coating.

8. The improvement of claim 7 further comprising a thermal oven for evaporating nonconductive material into a jet directed at said thin surface coating to refresh said surface coating as said coating is depleted by sputtering.

9. The improvement of claim 7 further comprising a highly sputterable material disposed in said conductive backing plates, indication of said sputterable trace material in said plasma indicating thinning of said coating and a decrease in plasma density indicating an increase in thickness of said coating for feedback control of said oven.

10. An improvement in a plasma chamber having a source region and an enrichment region contained within said plasma chamber, said source region provided with a plasma source for producing a plasma, said improvement comprising:

a magnet assembly for generating a shaped magnetic field in said plasma chamber wherein said shaped field provides a higher magnetic field intensity in said source region than in said enrichment region so that as said plasma flows from said source region to said enrichment region, plasma temperature in a direction perpendicular to said magnetic field decreases, wherein said plasma source includes a sputter plate composed of a nonconductive material provided with imbedded conductive doping for transferring excess charge from said plate.

11. An improvement in a plasma chamber having a source region and an enrichment region contained within said plasma chamber, said source region provided with a plasma source for producing a plasma, said improvement comprising:

a magnet assembly for generating a shaped magnetic field in said plasma chamber wherein said shaped field provides a higher magnetic field intensity in said source region than in said enrichment region so that as said plasma flows from said source region to said enrichment region, plasma temperature in a direction perpendicular to said magnetic field decreases, wherein said plasma source includes a sputter plate which is comprised of a filled porous conductive plate filled with sputterable nonconductive material for transferring excess charge from said plate.

12. An improvement in a plasma chamber having a source region, and a magnetic mirror comprising a product plate and a dump plate, and wherein said magnetic mirror is disposed within said plasma chamber on the end of said plasma chamber opposing said source region so that nonresonant ions are discriminatorily disposed on a dump plate disposed behind said magnetic mirror and resonant ions are reflected to said opposing end of said plasma chamber and deposited on said product plate.

13. The improvement of claim 12 further comprising a plasma injector and wherein said plasma is injected through said product plate.

14. The improvement of claim 13 wherein said plasma chamber includes an enrichment region and ICRH antennas for heating said plasma in said enrichment region and wherein said injector injects said plasma at a high axial velocity into said plasma chamber to reduce back-scattered particles and improve coupling to said ICRH antennas.

15. An improvement in a plasma chamber having a plasma source comprising a collector disposed behind said plasma source, said collector comprising a dump plate for back-scattered ions and a slat-and-shield assembly for collection of resonant ions.

16. An improvement in a plasma chamber having a plasma source and a plasma enrichment region comprising a collector disposed in front of said plasma source and comprised of a double shielded slat-and-shield assembly to permit transmission of low energy ions from said plasma source therethrough and to permit collection therein of high energy resonant ions from said plasma enrichment region.

17. An improvement in a plasma source in a plasma chamber having a source region comprising a plurality of ECRH microwave horns coupled to a corresponding plurality of microwave energy sources, each of said ECRH horns establishing separate ECRH zones in said source region adjacent to each other so that the ionization state of said plasma generated within said multiple ECRH zones is controllable.

18. The improvement of claim 17 wherein each of said ECRH horns provide energy to said corresponding ECRH zones at different tuned frequencies at different locations within said plasma chamber as determined by the resonance condition with said magnetic field to create a broad ECRH zone with shaped energy distribution therein.

19. An improvement in a plasma source comprising a sputter source of nonconductive material in the form of a thin coating of said nonconducting material disposed on and electrically coupled to a conductive backing plate, thickness of said coating being comparable to the ion implantation depth for incoming ions to said coating.

20. The improvement of claim 19 further comprising a thermal oven for evaporating material into a jet directed at said thin surface coating to refresh said surface coating as said coating is depleted by sputtering.

21. The improvement of claim 19 further comprising a highly sputterable material disposed in said conductive backing plate, indication of said sputterable trace material in said plasma indicating thinning of said coating and a decrease in plasma density indicating an increase in thickness of said coating for feedback control of said oven.

22. An improvement in a method of operating a plasma chamber having a source region and an enrichment region contained within a plasma chamber, said source region provided with a plasma source for producing a plasma, said improvement comprising the steps of:

generating a shaped magnetic field in said plasma chamber wherein said shaped field provides a higher magnetic field intensity in said source region than in said enrichment region so that as said plasma flows from said source region to said enrichment region, plasma temperature in a direction perpendicular to said magnetic field decreases;

forming an electron cyclotron resonant heating (ECRH) zone in said source region, said ECRH zone being in said higher magnetic field intensity provided in said source region so that as said plasma flows from said source region to said enrichment region, plasma density decreases;

energizing said ECRH region by a source of microwave energy, said source of microwave energy including a horn disposed in said plasma chamber and a waveguide coupling said horn to said source of microwave energy, said waveguide being routed into said plasma region in a direction generally perpendicular to said magnetic field in said source region; and diverting microwaves into said ECRH zone.

23. The improvement of claim 22 further comprising the step of routing a waveguide into said plasma chamber perpendicularly to said magnetic field within said chamber to avoid plasma breakdown within said waveguide, said waveguide including a microwave window for providing a vacuum seal between said plasma chamber and said microwave source, while permitting transmission of microwaves therethrough, and positioning said window in said oriented waveguide exterior to said plasma chamber.

24. An improvement in a method of operating a plasma chamber having a source region and an enrichment region contained within a plasma chamber, said source region provided with a plasma source for producing a plasma, said improvement comprising the steps of:

generating a shaped magnetic field in said plasma chamber wherein said shaped field provides a higher magnetic field intensity in said source region than in said enrichment region so that as said plasma flows from said source region to said enrichment region, plasma temperature in a direction perpendicular to said magnetic field decreases; and selecting an isotope by discriminatory separation of isotopes of said plasma by means of a magnetic mirror, wherein said plasma chamber is provided with a product plate and a dump plate, and wherein said magnetic mirror is disposed within said plasma chamber on the end of said plasma chamber opposing said source region, said step of selecting discriminatorily disposing nonresonant ions are on a dump plate disposed behind said magnetic mirror and discriminatorily disposing resonant ions on a product plate by reflection to said opposing end of said plasma chamber.

25. The improvement of claim 24 further comprising injecting a plasma through said product plate.

26. The improvement of claim 25 wherein said enrichment region includes ICRH antennas for heating said plasma in said enrichment region and wherein said step of injecting injects said plasma at a high axial velocity into said plasma chamber to reduce back-scattered particles and improve coupling to said ICRH antennas.

27. An improvement in a method of operating a plasma chamber having a source region and an enrichment region contained within a plasma chamber, said source region provided with a plasma source for producing a plasma, said improvement comprising the steps of:

generating a shaped magnetic field in said plasma chamber wherein said shaped field provides a higher magnetic field intensity in said source region than in said enrichment region so that as said plasma flows from said source region to said enrichment region, plasma temperature in a direction perpendicular to said magnetic field decreases; and selecting an isotope by discriminatory separation of isotopes of said plasma by means of a magnetic mirror, wherein collecting said isotope is performed on a collector disposed behind said plasma source, said collector comprising a dump plate for back-scattered ions and a slat-and-shield assembly for collection of resonant ions.

28. An improvement in a method of operating a plasma chamber having a source region and an enrichment region contained within a plasma chamber, said source region provided with a plasma source for producing a plasma, said improvement comprising the steps of:

generating a shaped magnetic field in said plasma chamber wherein said shaped field provides a higher magnetic field intensity in said source region than in said enrichment region so that as said plasma flows from said source region to said enrichment region, plasma temperature in a direction perpendicular to said magnetic field decreases; and selecting an isotope by discriminatory separation of isotopes of said plasma by means of a magnetic mirror, wherein collecting said isotope is performed on a collector disposed in front of said plasma source region by permitting transmission of low energy ions from said plasma source through a double shielded slat-and-shield assembly and collecting high energy resonant ions from said plasma enrichment region in said double shielded slat-and-shield assembly.

29. An improvement in a method of operating a plasma chamber having a source region and an enrichment region contained within a plasma chamber, said source region provided with a plasma source for producing a plasma, said improvement comprising the steps of:

generating a shaped magnetic field in said plasma chamber wherein said shaped field provides a higher magnetic field intensity in said source region than in said enrichment region so that as said plasma flows from said source region to said enrichment region, plasma temperature in a direction perpendicular to said magnetic field decreases;

forming an electron cyclotron resonant heating (ECRH) zone in said source region, said ECRH zone being in said higher magnetic field intensity provided in said source region so that as said plasma flows from said source region to said enrichment region, plasma density decreases; and forming a plurality of separate ECRH zones in said source region adjacent to each other by means of a corresponding plurality of ECRH microwave horns coupled to a corresponding plurality of microwave energy sources, so that the ionization state of said plasma generated within said multiple ECRH zones is controllable.

30. The improvement of claim 29 further comprising providing energy from each of said ECRH horns to said corresponding ECRH zones at different tuned frequencies at different locations within said plasma chamber as determined by the resonance condition with said magnetic field to create a broad ECRH zone with shaped energy distribution therein.

31. An improvement in a method of operating a plasma chamber having a source region and an enrichment region contained within a plasma chamber, said source region provided with a plasma source for producing a plasma, said improvement comprising the steps of:

generating a shaped magnetic field in said plasma chamber wherein said shaped field provides a higher magnetic field intensity in said source region than in said enrichment region so that as said plasma flows from said source region to said enrichment region, plasma temperature in a direction perpendicular to said magnetic field decreases;

forming a plasma source from a thin coating of said nonconducting material disposed on and electrically coupled to a conductive backing plate, thickness of said coating being comparable to the ion implantation depth for incoming ions to said coating; and providing material feedback of the thickness of said thin coating by monitoring for the presence of a highly sputterable material disposed in said conductive backing plates, indication of said sputterable trace material in said plasma indicating thinning of said coating and a decrease in plasma density indicating an increase in thickness of said coating for feedback control of said oven.

32. An improvement in a method of operating a plasma chamber having a source region and an enrichment region contained within a plasma chamber said source region provided with a plasma source for producing a plasma, said improvement comprising the steps of:

generating a shaped magnetic field in said plasma chamber wherein said shaped field provides a higher magnetic field intensity in said source region than in said enrichment region so that as said plasma flows from said source region to said enrichment region, plasma temperature in a direction perpendicular to said magnetic field decreases, further comprising the step of forming a plasma source from a sputter plate composed of a nonconductive material provided with imbedded conductive doping for transferring excess charge from said plate.

33. An improvement in a method of operating a plasma chamber having a source region and an enrichment region contained within a plasma chamber, said source region provided with a plasma source for producing a plasma, said improvement comprising the steps of:

generating a shaped magnetic field in said plasma chamber wherein said shaped field provides a higher magnetic field intensity in said source region than in said enrichment region so that as said plasma flows from said source region to said enrichment region, plasma temperature in a direction perpendicular to said magnetic field decreases, further comprising the step of forming a plasma source from a sputter plate which is comprised of a filled porous conductive plate filled with sputterable nonconductive material for transferring excess charge from said plate.

* * * * *